(12) United States Patent
Devadas et al.

(10) Patent No.: US 7,415,477 B2
(45) Date of Patent: Aug. 19, 2008

(54) METHOD AND APPARATUS FOR ALLOCATING LINK BANDWIDTH

(75) Inventors: Srinivas Devadas, Lexington, MA (US); Hari Balakrishnan, Winchester, MA (US); Daniel Rosenband, Cambridge, MA (US)

(73) Assignee: Broadcom Corporation, Irvine, CA (US)

( * ) Notice: Subject to any disclaimer, the term of this patent is extended or adjusted under 35 U.S.C. 154(b) by 612 days.

(21) Appl. No.: 10/482,864

(22) PCT Filed: Jul. 5, 2001

(86) PCT No.: PCT/US01/21185

§ 371 (c)(1),
(2), (4) Date: Jan. 5, 2004

(87) PCT Pub. No.: WO03/005227

PCT Pub. Date: Jan. 16, 2003

(65) Prior Publication Data

US 2004/0163084 A1   Aug. 19, 2004

(51) Int. Cl.
G06F 15/16 (2006.01)
G06F 15/173 (2006.01)
G06F 17/00 (2006.01)
(52) U.S. Cl. .................. 707/101; 709/230; 709/223
(58) Field of Classification Search ............. 707/101; 709/230, 223
See application file for complete search history.

(56) References Cited

U.S. PATENT DOCUMENTS

| | | | |
|---|---|---|---|
| 5,963,557 A | 10/1999 | Eng | 370/432 |
| 6,064,651 A | 5/2000 | Rogers et al. | 370/233 |
| 6,064,677 A | 5/2000 | Kappler et al. | 370/414 |
| 2003/0086424 A1 | 5/2003 | Tsubota | |
| 2003/0135449 A1 | 7/2003 | Xu et al. | |
| 2004/0081184 A1 | 4/2004 | Magill et al. | |
| 2005/0025141 A1 | 2/2005 | Chao et al. | |

OTHER PUBLICATIONS

Priority queues and sorting methods for parallel simulation Grammatikakis, M.D.; Liesche, S.; Software Engineering, IEEE Transactions on vol. 26, Issue 5, May 2000 pp. 401-422.*

On packet marking at priority queues Gibbens, R.J.; Kelly, F.P.; Automatic Control, IEEE Transactions on vol. 47, Issue 6, Jun. 2002 pp. 1016-1020.*

Load balancing of multipath source routing in ad hoc networks Linifang Zhang; Zenghua Zhao; Yantai Shu; Lei Wang; Yang, O.W. W.; Communications, 2002. ICC 2002. IEEE International Conference on vol. 5, Apr. 28-May 2, 2002 pp. 3197-3201 vol. 5.*

(Continued)

Primary Examiner—David Y Jung
(74) Attorney, Agent, or Firm—Sterne Kessler Goldstein & Fox, p.l.l.c.

(57) ABSTRACT

A method and apparatus for selecting a queue for service across a shared link. The method includes determining a priority for each queue (202) within a plurality of ingresses (102), wherein the priority is instantaneous for a given timeslot for data transfer, selecting a queue having a first priority for each group of queues within each ingress (104) having packets destined for a particular egress (104), selecting a queue having a second priority for each subset of queues having first priorities and having packets destined for the particular egress (104), and selecting the queue having the second priority for service across the shared link in the given timeslot.

68 Claims, 15 Drawing Sheets

OTHER PUBLICATIONS

A policy based networking architecture for enterprise networks Nomura, Y.; Chugo, A.; Adachi, M.; Toriumi, M.; Communications, 1999. ICC '99. 1999 IEEE International Conference on vol. 1, Jun. 6-10, 1999 pp. 636-640 vol. 1.*

Load-balanced routing and scheduling for real-time traffic in packet-switch networks Sangman Bak; Cheng, A.M.K.; Cobb, J.A.; Leiss, E.L.; Local Computer Networks, 2000. LCN 2000. Proceedings. 25th Annual IEEE Conference on Nov. 8-10, 2000 pp. 634-643.*

Queueing in high-performance packet switching Hluchyj, M.G.; Karol, M.J.; Selected Areas in Communications, IEEE Journal on vol. 6, Issue 9, Dec. 1988 pp. 1587-1597.*

Priority queues and sorting methods for parallel simulation Grammatikakis, M.D.; Liesche, S.; Software Engineering, IEEE Transactions on vol. 26, Issue 5, May 2000 pp. 401-422.*

Dynamic queue length thresholds for shared-memory packet switches Choudhury, A.K.; Hahne, E.L.; Networking, IEEE/ACM Transactions on vol. 6, Issue 2, Apr. 1998 pp. 130-140.*

* cited by examiner

METHOD AND APPARATUS FOR ALLOCATING LINK BANDWIDTH

The present invention relates generally to a method and system for allocating bandwidth over a shared link, and more particularly to such methods and systems that streamline protocol processing and maintain quality of service guarantees.

BACKGROUND

FIG. 1 shows a typical switching system 10 for managing traffic of packets of information over a network backbone. The system 10 contains one or more input ingresses I1, I2, I3, one or more output egresses E1, E2, E3, and a switch or crossbar 12. Three ingresses I1, I2, I3 and three egresses E1, E2, E3 are depicted in FIG. 1, although any number of ingresses and egresses can be connected in the switching system 10. Packets of data enter the ingresses I1, I2, I3 through traffic sources 14 and exit from the egresses E1, E2, E3, through traffic exits 16. In typical operation, the switching system 10 can connect a given ingress to a given egress through the crossbar or switch 12 such that there is a one-to-one mapping between an ingress and egress, or it can connect a given ingress to one or more egresses such that there is a one-to-many mapping between ingresses and egresses. In other words, for every timeslot for transfer of data through the switching system 10, each egress can only receive data from a single ingress. However, an ingress can send data to multiple egresses. Further, each ingress I1, I2, I3, contains a plurality of queues for storing packets of data and each egress E1, E2, E3 contains a plurality of buffer FIFOS (First-In-First-Out). For each timeslot, a single queue within each ingress can be connected to one or more ports within one or more egresses. For example, during a given timeslot, queue Q2 within ingress I1 can be connected to buffer FIFO1 within egress E3, queue Q1 within ingress I2 can be connected to buffer FIFO1 within egress E1, and queue Q1 within ingress I3 can be connected to buffer FIFO3 of egress E2.

Generally, one goal of a switching system, such as the system 10 of FIG. 1, is to maximize usage of the switch or crossbar 12 such that its valuable bandwidth (a so-called scarce resource) is used efficiently. A second goal of switching systems can be to service packets for customers depending on Quality-of-Service (QoS) guarantees. Another goal of switching systems can be to prevent certain packets from being queued in the switching system for unacceptably long periods of time prior to transmission through the system 10. A need exists for accomplishing these goals with improved methods and systems.

The size of a timeslot for data transfer across the switch or crossbar 12 in the switching system 10 of FIG. 1 generally determines the amount of data that can be sent in a single timeslot. Two methods are commonly used to select the size of a timeslot for data transfer in currently implemented switching systems, such as the system 10 of FIG. 1, where packet sizes vary considerably. The first method is to use a timeslot size that is sufficiently large so that most packets of information in the queues can be transmitted through the switch or crossbar 12 during a given timeslot. A problem with such a method, however, is low utilization of the system 10. Portions of each timeslot will likely not be filled, and hence the available bandwidth, which is generally costly, will not be used.

The second method used to select timeslot size is to use a timeslot size that is smaller than that used in the first method. Then, however, packets that are larger than the timeslot must be broken into more than one segment so that each segment will fit through the switching system 10 in a single timeslot. This second method may reduce the low utilization problem associated with the first method discussed above; however, it requires that the packets be broken (segmented) into multiple segments at an ingress I1, I2, I3 and then rebuilt (reassembled) at an egress E1, E2, E3. Such segmentation and reassembly can constrain the performance of the switching system 10.

A need exists for a method and system for allocating bandwidth over a link that properly allocates the bandwidth to maximize utilization of bandwidth, ensure QoS guarantees, and prevent packets from being queued indefinitely in a switching system while, at the same time, ensuring that the method and system operate in a "fair" manner. Finally, a need exists for a method and system for maximizing utilization of a timeslot for data transfer without causing a segmentation and reassembly problem.

SUMMARY

One embodiment of the invention relates to a method for selecting a packet for transmission across a shared link. In this embodiment, the method features determining a priority for a first-out packet in each of a plurality of queues within each of a plurality of ingresses, for each group of first-out packets within the queues of each ingress which are destined for a particular egress, selecting a first-out packet having a first priority; for each subset of selected first-out packets having first priorities and being destined for the particular egress, selecting a first-out packet having a second priority; and transmitting from each ingress across the shared link the selected first-out packet having the second priority.

Another embodiment of the invention relates to a method for selecting a queue for service across a shared link. In this embodiment, the method features determining a priority for each queue within a plurality of ingresses, wherein the priority is instantaneous for a given timeslot for data transfer; for each group of queues within the plurality of ingresses having packets destined for a particular egress, selecting a queue having a first priority; and servicing the selected queue having the first priority for each group across the shared link in the given timeslot.

Another embodiment of the invention relates to a method for selecting a queue for service across a shared link. In this embodiment, the method features determining a priority for each queue within a plurality of ingresses, wherein the priority is instantaneous for a given timeslot for data transfer; for each group of queues within each ingress having packets destined for a particular egress, selecting a queue having a first priority; for each subset of selected queues having first priorities and having packets destined for the particular egress, selecting a queue having a second priority, and servicing the selected queue having the second priority for each subset across the shared link in the given timeslot Another embodiment of the invention relates to a system for selecting a queue for service across a shared link. In this embodiment, the system features a metering module within an ingress to (a) determine a priority for each queue within the ingress, wherein the priority is instantaneous for a given timeslot for data transfer, and (b) for each group of queues within the ingress having packets destined for a particular egress, select a queue having a first priority, and an arbitration module to select a queue having a second priority from each subset of selected queues having first priorities and having packets destined for the particular egress, the selected queue having the second priority being the queue for service across the shared link in the given timeslot.

Another embodiment of the invention is a computer-readable medium storing instructions that direct a microprocessor to determine a priority for each queue within a plurality of ingresses, wherein the priority is instantaneous for a given timeslot for data transfer, for each group of queues within each ingress having packets destined for a particular egress, select a queue having a first priority, for each subset of selected queues having first priorities and having packets destined for the particular egress, select a queue having a second priority, and service the selected queue having the second priority for each subset across the shared link in the given timeslot.

Another embodiment of the invention relates to a system for selecting a queue for service across a shared link. In this embodiment, the system features an element for determining a priority for each queue within a plurality of ingresses, wherein the priority is instantaneous for a given timeslot for data transfer; an element for selecting a queue having a first priority for each group of queues within each ingress having packets destined for a particular egress; an element for selecting a queue having a second priority for each subset of selected queues having first priorities and having packets destined for the particular egress; and an element for servicing the selected queue having the second priority for each subset across the shared link in the given timeslot.

Another embodiment of the invention relates to a method for selection of a queue for service across a shared link, wherein each queue has a priority for data transfer that is instantaneous for a given timeslot. In this embodiment, the method features receiving from each ingress information regarding at least one queue having a first priority selected from each group of queues within each ingress having packets destined for a particular egress; selecting a queue having a second priority from each subset of selected queues having first priorities and having packets destined for the particular egress; and selecting the queue having the second priority for service across the shared link in the given timeslot.

Yet another embodiment of the invention relates to an apparatus for selection of a queue for service across a shared link, wherein each queue has a priority for data transfer that is instantaneous for a given timeslot. In this embodiment, the apparatus features a memory storing a program and a processor in communication with the memory; in which the processor is directed by the program to: receive from each ingress information regarding at least one queue having a first priority selected from each group of queues within each ingress having packets destined for a particular egress, select a queue having a second priority from each subset of selected queues having first priorities and having packets destined for the particular egress, and select the queue having the second priority for service across the shared link in the given timeslot.

Another embodiment of the invention relates to a computer-readable medium for selection of a queue for service across a shared link, wherein each queue has a priority that is instantaneous for a given timeslot for data transfer. The computer-readable medium in this embodiment stores instructions that direct a microprocessor to: receive from each ingress information regarding at least one queue having a first priority selected from each group of queues within each ingress having packets destined for a particular egress, select a queue having a second priority from each subset of selected queues having first priorities and having packets destined for the particular egress, and select the queue having the second priority for service across the shared link in the given timeslot.

Another embodiment of the invention is a method for selecting a queue for service across a shared link. In this embodiment, the method features determining a priority for each queue within a plurality of ingresses, wherein the priority is instantaneous for a given timeslot for data transfer. The method then features, within each ingress, for each group of queues having packets destined for a particular port of a particular egress, selecting a queue having a first priority. The queues in the group can have varying classes of service. Next, within an arbiter chip, for each subset of selected queues having first priorities and having packets destined for the same particular egress, selecting a queue having a second priority. This selection can be from queues having packets bound for different ports of the same particular egress. Next, within the arbiter chip, for each subset of selected queues from the plurality of ingresses having second priorities and having packets destined for the same particular egress, selecting a queue having a third priority. Finally, the method features servicing the selected queue having the third priority for each subset across the shared link in the given timeslot.

Another embodiment of the invention relates to a method for apportioning bandwidth across a shared link. In this embodiment, the method features maintaining queue metric information for each queue of a group of queues, calculating a guaranteed rate for each queue based on the queue metric information and a guaranteed bandwidth amount for the group of queues, adjusting a credit value associated with each queue by (a) adjusting the credit value of the queue by an appropriate amount if the queue is serviced in a given timeslot, and (b) adjusting the credit value of the queue by an amount based on the guaranteed rate after the given timeslot; and using queue state information selected from one or more of the group consisting of the credit value, partial packet information, a shaping limit, and an indication of whether the queue is empty, to determine a priority for the queue, the priority acting to apportion bandwidth.

Another embodiment of the invention relates to a method for guaranteeing bandwidth for an egress of a shared link system. In this embodiment, the method features maintaining information regarding a queue metric for each queue in a group of queues with packets destined for the egress, wherein the queues reside within one or more ingresses of the shared link system, calculating a guaranteed rate for each queue in the group of queues based on the queue metric information and a guaranteed bandwidth amount for the egress, and using the guaranteed rate to calculate a credit value for each queue in the group of queues, wherein the credit values are used to allocate bandwidth.

Another embodiment of the invention relates to a method for guaranteeing bandwidth for an ingress of a shared link system. In this embodiment, the method includes maintaining information regarding a queue metric for each queue in a group of queues within the ingress, wherein packets within the queues are destined for one or more egresses of the shared link system, calculating a guaranteed rate for each queue in the group of queues based on the queue metric information and a guaranteed bandwidth amount for the ingress, and using the guaranteed rate to calculate a credit value for each queue in the group of queues, wherein the credit values are used to allocate bandwidth.

Another embodiment of the invention relates to a method for determining a guaranteed rate for use in apportioning bandwidth across a shared link. In this embodiment, the method features maintaining information regarding a queue metric for each queue in a group of queues, calculating a guaranteed rate for each queue in the group of queues based on the queue metric information and a guaranteed bandwidth amount for the group of queues, and sending the guaranteed rate to an ingress associated with each queue, wherein the guaranteed rates are used to apportion bandwidth.

Another embodiment of the invention relates to an apparatus for determining a guaranteed rate for use in apportioning bandwidth across a shared link. In this embodiment, the apparatus includes a memory storing a program and a processor in communication with the memory; in which the processor is directed by the program to: maintain information regarding a queue metric for each queue in a group of queues; calculate a guaranteed rate for each queue in the group of queues based on the queue metric information and a guaranteed bandwidth amount for the group of queues; and send the guaranteed rate to an ingress associated with each queue, wherein the guaranteed rates are used to apportion bandwidth.

Another embodiment of the invention relates to a method for apportioning bandwidth across a shared link. In this embodiment, the method features determining information regarding a queue metric for each queue in a group of queues, transmitting the queue metric information to a bandwidth allocator module, receiving a guaranteed rate for each queue in the group from the bandwidth allocator module, adjusting a credit value associated with each queue by (a) decrementing the credit value of the queue by an appropriate amount if the queue is serviced in a given timeslot, and (b) incrementing the credit value of the queue by an amount based on the guaranteed rate of the queue after the given timeslot; and determining a priority for each queue in the group using the credit values, the priorities acting to allocate bandwidth.

Another embodiment of the invention relates to a method for apportioning bandwidth across a shared link. In this embodiment, the method features calculating a guaranteed rate for each queue in at least one ingress based on queue metric information and a guaranteed bandwidth amount, calculating a priority for each queue to connect with the shared link in a given timeslot, the priority for each queue being instantaneous for the given timeslot and being based on the guaranteed rate for each queue, and determining at least one queue to service during the given timeslot based on the priority of each queue.

Another embodiment of the invention relates to a system for apportioning bandwidth across a shared link. In this embodiment, the system features a bandwidth allocator module to calculate a guaranteed rate for each queue in at least one ingress based on queue metric information and a guaranteed bandwidth amount, a metering module in each ingress to calculate a priority for each queue in the ingress to connect with the shared link in a given timeslot, the priority for each queue being instantaneous for the given timeslot and being based on the guaranteed rate for each queue, and an arbitration module to determine at least one queue to service during the given timeslot based on the priority of each queue.

Another embodiment of the invention relates to a system for apportioning bandwidth across a shared link. In this embodiment, the system features an ingress chip containing a plurality of queues and a metering module to calculate a priority for each queue in the ingress chip to connect with the shared link in a given timeslot, the priority for each queue being instantaneous for the given timeslot and being based on a guaranteed rate for each queue; and an arbiter chip containing: (a) a bandwidth allocator module to calculate the guaranteed rate for each queue within one or more ingress chips based on queue metric information and a guaranteed bandwidth amount, and (b) an arbitration module to determine at least one queue to service during the given timeslot based on the priority of each queue.

Another embodiment of the invention relates to a method for apportioning bandwidth across a shared link. In this embodiment, the method features maintaining information regarding a queue metric for each queue in a group of queues; calculating a guaranteed rate for each queue in the group of queues based on the queue metric information and a guaranteed bandwidth amount for the group of queues; sending the guaranteed rate for each queue to an ingress associated with each queue, wherein each ingress is capable of calculating a priority for each queue in the ingress using the guaranteed rate for the queue; receiving from each ingress information regarding at least one queue having a first priority selected from each group of queues within each ingress having packets destined for a particular egress; selecting a queue having a second priority for each subset of queues having first priorities and having packets destined for the particular egress; and selecting the queue having the second priority for service across the shared link in the given timeslot.

Another embodiment of the invention relates to a method for apportioning bandwidth across a shared link. In this embodiment, the method features determining information regarding a queue metric for each queue within an ingress; transmitting the queue metric information to a bandwidth allocator module; receiving a guaranteed rate for each queue from the bandwidth allocator module, the guaranteed rate calculated at least in part using the queue metric information; adjusting a credit value associated with each queue by (a) decrementing the credit value of the queue by an appropriate amount if the queue is serviced in a given timeslot, and (b) incrementing the credit value of the queue by an amount based on the guaranteed rate of the queue after the given timeslot; determining a priority for each queue within the ingress, wherein the priority is instantaneous for the given timeslot; for each group of queues within the ingress having packets destined for a particular egress, selecting at least one queue having a first priority, sending to an arbitration module information regarding each queue within the ingress having a first priority; and receiving from the arbitration module information regarding a queue having a second priority, wherein the queue having the second priority determines with which egress the ingress will communicate during the given timeslot.

Another embodiment of the invention relates to a method for servicing queues across a shared link. In this embodiment, the method features ascertaining the size of a first-out packet for each queue within an ingress, and if the size of the first-out packet in each queue is too large for transmission across the shared link in a single given timeslot for data transfer, maintaining a connection to the shared link when the queue having the first-out packet is selected for data transfer such that the entire first-out packet is transferred across the shared link in two or more timeslots for data transfer.

Yet another embodiment of the invention relates to a method for determining a priority for each queue of a plurality of queues in a system, wherein the priorities determine allocation of bandwidth across a shared link and the queue having the highest priority is served during a given timeslot. In this embodiment, the method involves, if the queue contains a partial packet, setting the priority to a maximum priority; if the queue is empty, setting the priority to a minimum priority; and if the queue has a credit value that is greater than zero, determining the priority to be a rounded number between the maximum priority and the minimum priority equal to the credit value divided by a scaling factor.

DETAILED DESCRIPTION

A. General Overview

The embodiments of the invention provide for configurable, weighted, and distributed scheduling methods and systems that can be used to implement QoS guarantees for data transfer and to fairly determine which queue to service during a given timeslot.

1. System Architecture

Figure 1:
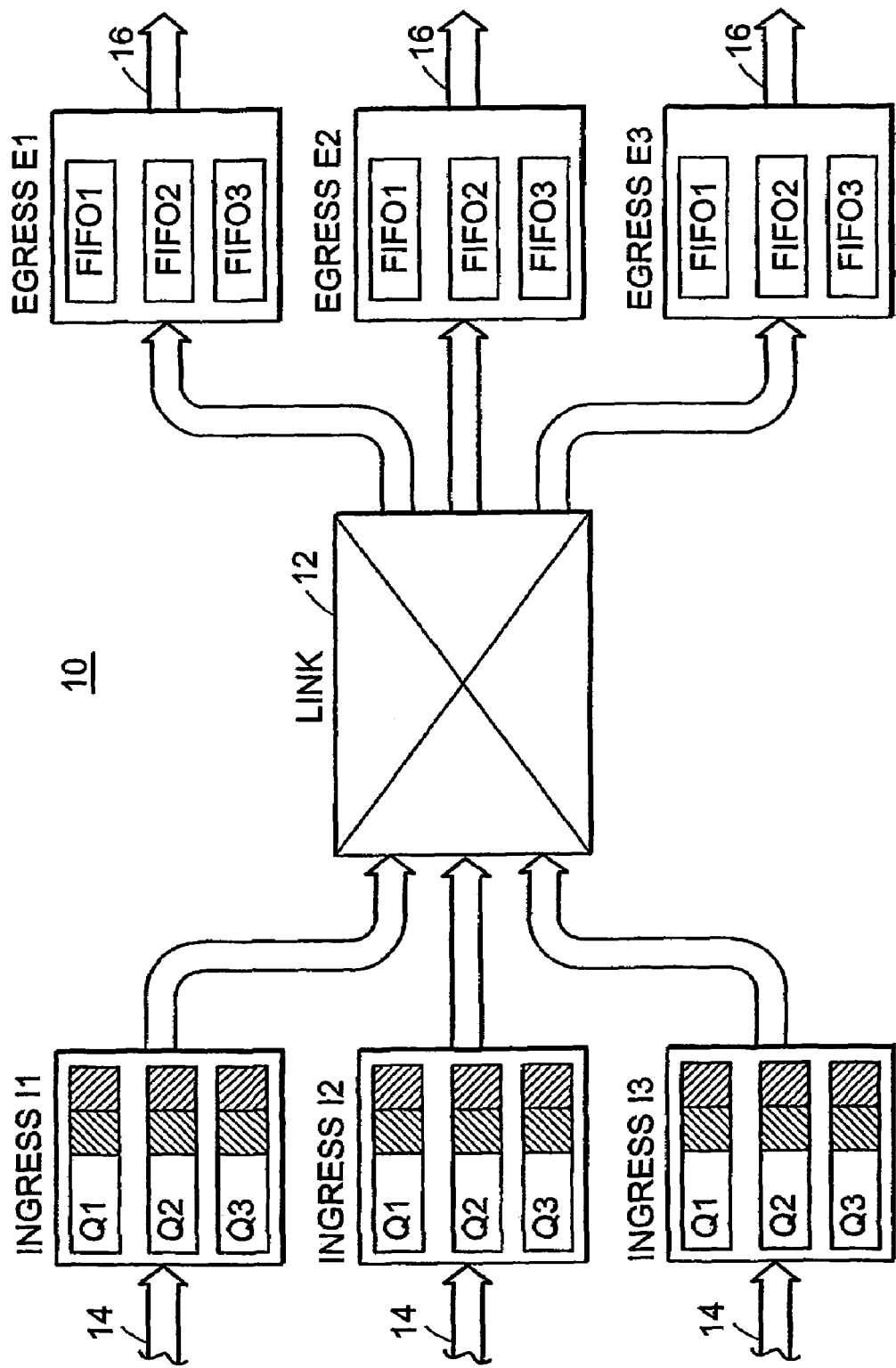
FIG. 1 is a block diagram of a prior art switching system.
Figure 2:
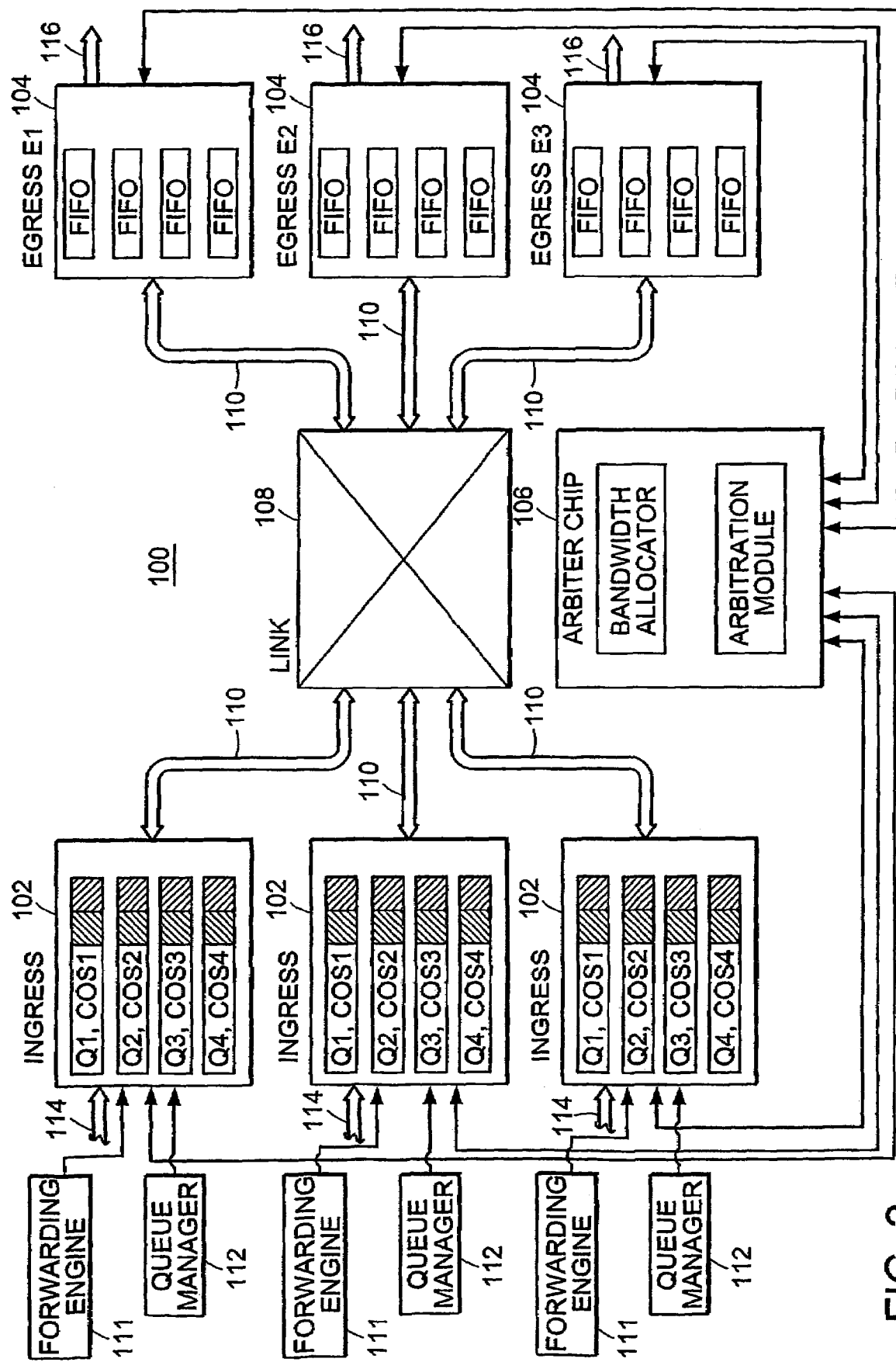
FIG. 2 is a block diagram of one embodiment of the system of the invention.

FIG. 2 shows a block diagram of a system 100 according to an embodiment of the invention. The system 100 of FIG. 2 contains a number of modular components, which, in one embodiment, are chips. The system 100 of FIG. 2 contains one or more ingress chips 102, one or more egress chips 104, an arbiter chip 106, and a shared switch or crossbar chip or link 108 that can connect any ingress 102 to any egress 104 using pipelines 110. In addition, each ingress 102 can have associated therewith a forwarding engine or queue manager 112. Packets of data enter the ingresses 102 from traffic sources 114 and exit the egresses 104 to traffic outputs 116. A plurality of ingresses 102 can be linked to a plurality of egresses 104 over the shared link 108. For example, in one embodiment, sixty-four ingresses 102 can be linked to sixty-four egresses over the shared link 108.

The embodiments described below operate in a shared link system, which is a system having a shared link 108 connecting one or more ingresses 102 to one or more egresses 104. For every timeslot for transfer of data through the system 100, each egress 104 can only be connected to a single ingress 102, although a single ingress 102 can be connected to one or more egresses 104. Throughout this specification, therefore, the term "shared link system" will be used to refer to a system through which one or more egresses can be connected to a single ingress to transfer data during a given timeslot. The term "shared link," similarly, will be used throughout this specification to refer to the linking device, switch, or crossbar that is configurable for each timeslot for data transfer and is used in the shared link system to connect one or more egresses to a single ingress to transfer data.

Figure 3A:
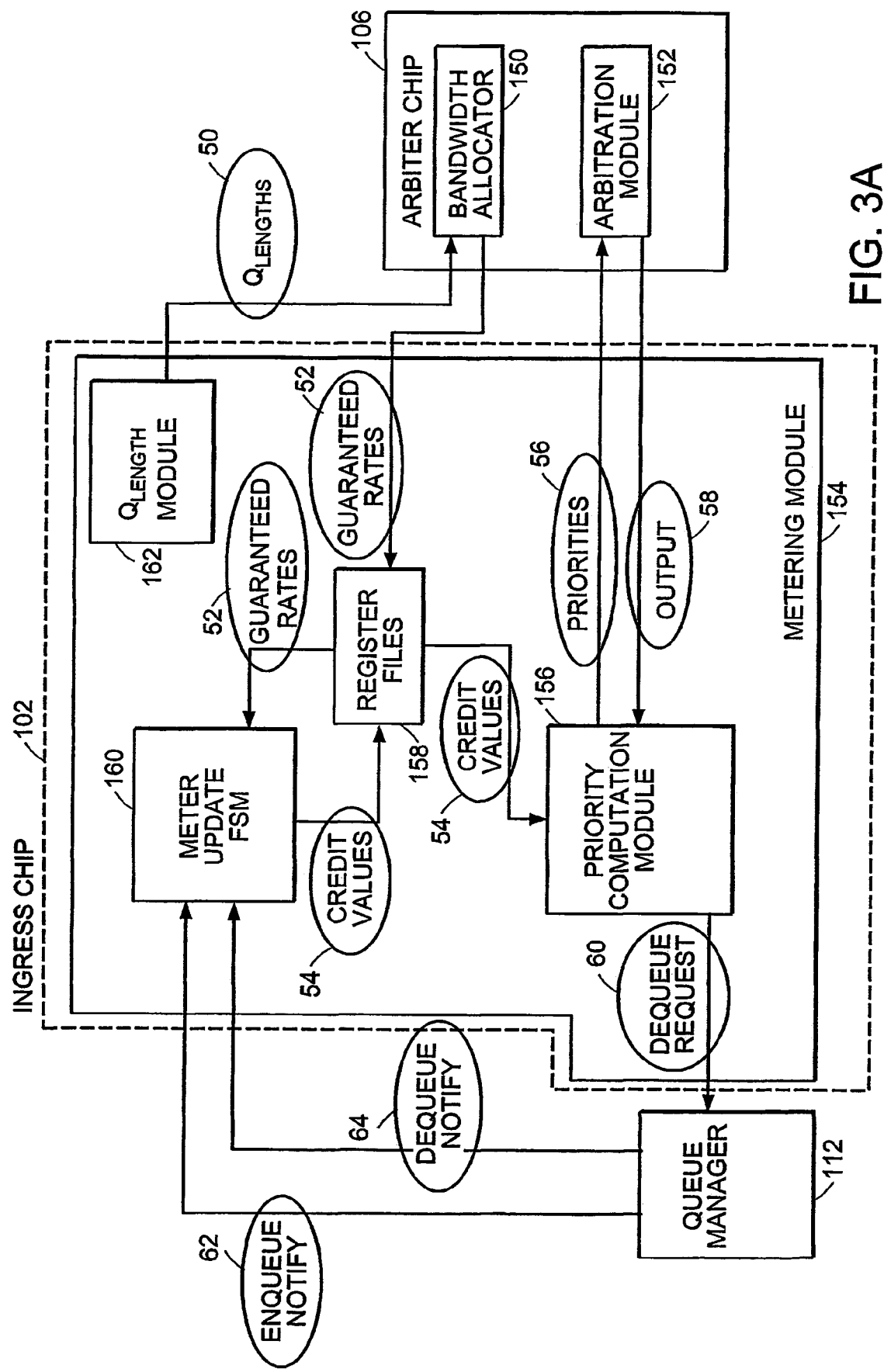
FIG. 3A is a block diagram of one embodiment of the arbiter chip, ingress chip, and queue manager of the invention.

In an embodiment using chips as the molecular components of the invention, each chip can be an integrated circuit chip having a signal processing unit and an interface unit. The signal processing unit can run at any speed sufficient to perform the operations described herein. In one embodiment, for example, a 1 GHz processor is used in the arbiter chip 106. The functions of each module of the invention can be performed in software or in hardware. FIG. 3A depicts an ingress chip 102 having register files 158, and such an ingress chip 102 can have hardware or firmware modules therein to perform the functions of the invention.

Each traffic source 114 connected to each ingress 102 and each traffic output 116 connected to each egress 104 has an associated bandwidth rate, such as 10 Gbps. In one embodiment, each pipeline 110 connecting an ingress 102 or an egress 104 to the shared link 108 has an associated bandwidth rate that is larger than the traffic source 114 bandwidth rate or traffic output 116 bandwidth rate. The pipelines 110, therefore, can be high-speed links. For example, if the bandwidth rate of traffic source 114 into an ingress 102 is 10 Gbps, the pipeline associated therewith to connect to the shared link 108 can have a bandwidth rate of 10-20 Gbps. In such an embodiment, the system 100 of the invention is able to make bandwidth guarantees over the shared link 108 due in part to the fast pipelines 110 into and out of the link 108 compared to the bandwidth rates into the ingresses 102 or out from the egresses 104. In other embodiments, the pipelines 110 have bandwidth rates that are the same as the traffic source 114 or traffic output 116 bandwidth rates.

FIG. 3A is a block diagram of one embodiment showing a single arbiter chip 106, ingress chip 102, and forwarding engine or queue manager 112 of the invention. In one embodiment, the arbiter chip 106 contains a bandwidth allocator module 150 and an arbitration module 152. Depicted in FIG. 3A in the ingress 102 is a metering module 154, which includes a priority computation module 156, register files 158, a metering update module 160, and a queue length module 162. In one embodiment, the bandwidth allocator module 150 and the arbitration module 152 reside within the ingress 102, as can the queue manager 112. In a system with multiple ingresses 102 attached to a shared link 108, such as the system 100 of FIG. 2, it can be desirable to have the bandwidth allocator module 150 and the arbitration module 152 in a separate arbiter chip 106 such that a single arbiter chip 106 is used to service a plurality of ingresses 102. The functions of each module are described in detail below.

The embodiment of FIG. 3A depicts a single ingress 102 and a single arbitrator chip 106. More typically, however, a single arbitrator chip 106 is used in a system with multiple ingresses 102, such as the system 100 of FIG. 2.

Each ingress 102 of the system 100 contains a plurality of buffer queues. FIG. 2 depicts ingresses 102, each having four queues Q1, Q2, Q3, Q4, although any number of queues can be in each ingress 102. In one embodiment, an ingress chip 102 contains 1024 queues. Associated with each queue is a class of service (COS) for that queue. Each COS refers to a different level of service for the packets in the queue associated with that COS. For example, queue Q1 in each ingress 102 of FIG. 2 has COS1, queue Q2 has COS2, queue Q3 has COS3, and queue Q4 has COS4. COS1 can be associated with a bandwidth rate of 1 gigabytes per second (Gbps), COS2 can have a bandwidth rate of 0.25 Gbps, and so forth, such that the packets in queues with different COSs are serviced at different rates. As packets of data enter each ingress 102, the packets are buffered in an appropriate queue corresponding to the COS for that packet. Each packet in a queue is destined for a particular, but not necessarily the same, egress (i.e., the packet contains data indicating that it desires to be sent to that egress). A forwarding engine 111 associated with each ingress 102 can route packets of data entering the ingress 102 to an appropriate queue within the ingress 102.

Each egress 103 of system 100 generally contains a number of FIFO (First-In-FIrst-Out) buffers or ports to buffer packets received through the shared link 108 before the packets are sent out through the traffic outputs 116. In one embodiment of the invention, a single chip can function as either an ingress 102 or as an egress 104. Such a chip would contain an ingress side that could perform the functions of an ingress 102, as described below, and an egress side with FIFOs to perform the functions of an egress 104.

Figure 3B:
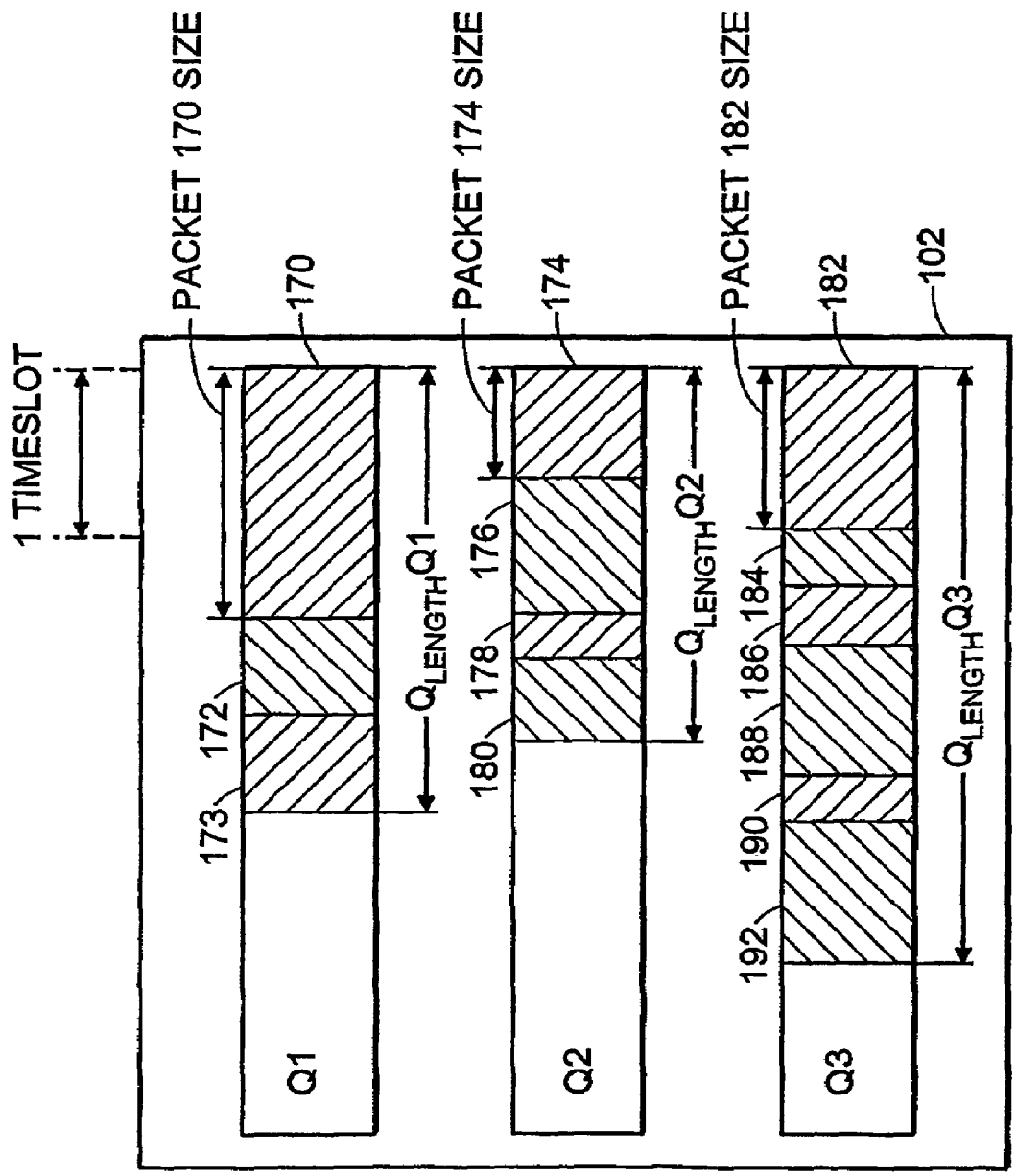
FIG. 3B is a block diagram showing packets of data within queues of an ingress.

FIG. 3B shows a detailed view of packets within queues of ingress 102. FIG. 3B shows a single ingress 102 having queues Q1, Q2, and Q3, although, as noted above, a larger number of queues may reside within an ingress 102. As FIG. 3B depicts in simplified visual form, each queue Q1, Q2, Q3 contains a number of packets buffered within the queue. For instance, queue Q1 contains packets 170, 172, and 173, queue Q2 contains packets 174, 176, 178, and 180, and queue Q3 contains packets 182, 184, 186, 188, 190, and 192. At the head of queue Q1 is packet 170, at the head of queue Q2 is packet 174, and at the head of queue Q3 is packet 182. In accordance with this embodiment, in each timeslot in which data will be sent over the shared link 108 of the system 100 of the invention, only the packet or packets at the head of each queue (a first-out packet or packets) that fit within a single timeslot are eligible to contend for access to the shared link 108. For the next timeslot, for the depiction of FIG. 3B, therefore, only packets 170, 174, and 182 are available to contend for access to the shared link 108. A timeslot is a fixed unit of time, and in each timeslot the shared link 108 can be configured for data transfer. In one embodiment, the timeslot can be set to about 200-650 nanoseconds, although the timeslot size can vary in different embodiments. Approximately 460-1,500 bytes of data can be transferred over the shared link 108 in a 200-650 nanoseconds timeslot in the illustrated embodiment.

FIG. 3B also illustrates in block form that packets within the queues of an ingress 102 can be of varying size, and the size of the queues within an ingress 102 can also vary in size. For example, packet 170 in queue Q1 has a packet size that is larger than packet 174 in queue Q2, and also larger than packet 182 in queue Q3. In addition, packet 182 in queue Q3 is also larger in size than packet 174 in queue Q2. Such packet sizes can be measured in bytes or in bits. FIG. 3B also shows the size of a single timeslot, in this embodiment, for data transfer across the shared link 108. Packet 170 is larger in size than a single timeslot, while packet 174 and packet 182 both appear to be smaller than or equal to the size of a single timeslot. Finally, FIG. 3B depicts the size of each queue (Qlength), at a particular instant in time, within the ingress 102. For example, queue Q1 has QlengthQ1 that is larger than QlengthQ2 for queue Q2, but smaller than QlengthQ3 for queue Q3. FIG. 3B depicts a simplified ingress 102 where only a small number of packets reside within each queue, but the concept of Qlengths is illustrated. A Qlength is a measure of the size of the data stored at a particular instant in time within a given queue, and can therefore be measured in bytes.

Note that in the embodiment illustrated in FIG. 3B, each queue has the same total length (capacity) available for buffering of packets, although in other embodiments, these lengths may also vary.

2. Overview of System Operation

Figure 4A:
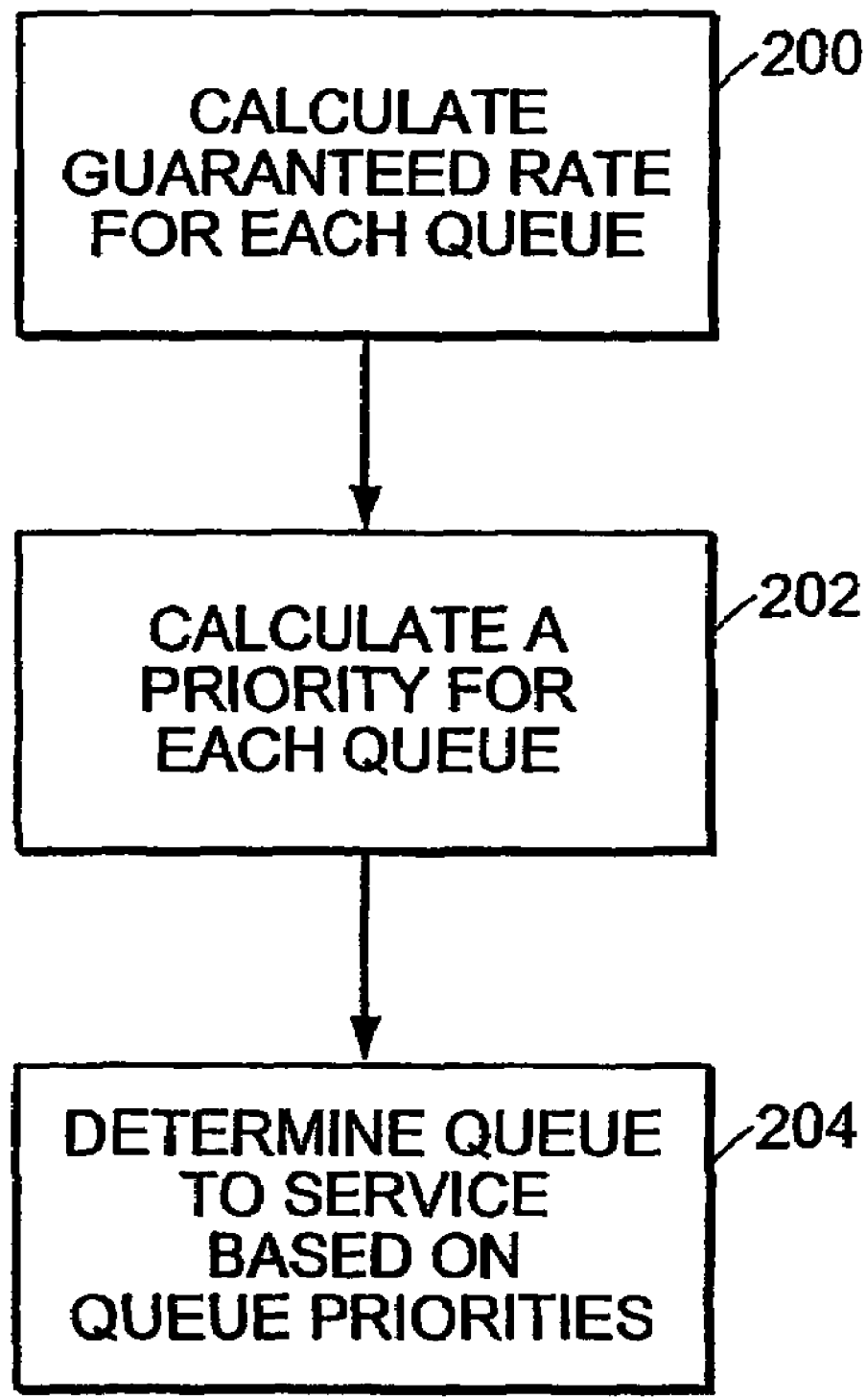
FIG. 4A is a flow chart showing one embodiment of the methods of the invention.

FIG. 4A is a flow chart showing one embodiment of the operation of the invention. Generally, the invention involves calculating a guaranteed rate for each queue based on queue metric information for the queue (block 200), calculating a priority for each queue during a given timeslot (block 202) based on the guaranteed rate for the queue, and determining a queue to service during a given timeslot based on the priority of each queue (block 204).

As used throughout this specification, a "guaranteed rate" generally refers to an update rate for a queue that is used to allocate bandwidth in a system The unit of such a guaranteed rate may be, for instance, Gbps. The guaranteed rates control the bandwidth available to each queue since they are used to control the rate at which a credit value associated with each queue increases with time. Each queue of each ingress has a credit value associated with it, and the guaranteed rate for each queue can be used to increase the credit value for the queue if the queue is not serviced during a given timeslot. The credit values, in turn, can be used to update a priority for each queue in the system. As used throughout this specification, a "priority" refers to the desire of a given queue to communicate with a given egress during a timeslot for data transfer. Generally, therefore, the queue to be serviced during each timeslot is determined based on the priorities calculated for each queue during each timeslot. Queues having high priorities for communication with a given egress, for instance, will be serviced before queues having lower priorities for communication with that same egress. The shared link 108 of FIG. 2 is reconfigured for each timeslot based on the priorities to assign a one-to-one mapping between ingresses and egresses. The guaranteed rates, therefore, indirectly control how often each queue is serviced or, alternatively, how often a subset of queues is serviced.

The bandwidth allocator module 150 is used, in this embodiment, to calculate the guaranteed rate for each queue in the system 100 (block 200 of FIG. 4A). The guaranteed rates are calculated according to a number of methods using some queue metric information received from the queue length module 162 or the queue manager 112. The queue metric information used to calculate the guaranteed rates is information about the queue, such as, but not limited to, the Qlength of the queue (i.e., bytes) or the arrival rate (i.e., bytes per second) of data to the queue. The queue manager 112 can calculate or track arrival rate information of data to the queue, and the queue length module 162 can calculate the current length or size of the queue. Some methods for calculation of guaranteed rates are discussed in greater detail below in connection with FIGS. 5-7B. Generally, to calculate a guaranteed rate, the queue length module 162 (or the queue manager 112) of FIG. 3A measures and sends queue metric information for each queue of the corresponding ingress 102 to the bandwidth allocator module 150. FIG. 3A, for instance, depicts the Qlengths 50 for the queues being sent to the bandwidth allocator module 150. Using the bandwidth allocation methods discussed below, the bandwidth allocator module 150 then calculates a guaranteed rate for each queue of each ingress 102 of the system 100, and sends the guaranteed rates 52 to the corresponding ingress 102. These guaranteed rates can be calculated periodically (i.e., not necessarily each timeslot) and then periodically communicated to the corresponding ingress 102.

The meter update module 160 of the metering module 154 of each ingress 102, in this embodiment, then uses the guaranteed rates to update a credit value for each queue in the ingress 102. The meter update module 160, on one embodiment, updates a credit value for each queue during every timeslot for data transfer across the shared link 108. FIG. 3A depicts the meter update module 160 receiving the guaranteed rates 52 from the bandwidth allocator module 150 through the register files 158, and then transmitting the updated credit values 54 to the register files 158. The credit values 54 or other information about the queues are used to calculate priorities for service of each queue in this embodiment. The credit values can be updated in the meter update module 160 according to a number of methods. Generally, the credit value for a given queue is increased if the queue after each timeslot. The increase of the credit value increases the corresponding priority for the queue, thus incrementing the priority of the queue over a number of timeslots so that the queue will eventually be serviced. In this embodiment, if the queue is serviced during a given timeslot, the credit value for the queue is decreased so that the connection to the shared link 108 will not be maintained indefinitely (i.e., the priority for the queue is decreased). A number of methods can be used to update credit values for queues, and one such method is discussed below in greater value in connection with FIG. 8.

In this embodiment, the priority computation module 156 of the metering module 154 of the ingress 102 uses the credit values or other information about the queues to calculate a priority (block 202 of FIG. 4A) with which each queue desires to be serviced over the shared link 108. FIG. 3A depicts the priority computation module 156 receiving the credit values 54 for the queues of the ingress 102 from the register files 158 and then sending priorities 56 to the arbitration module 152. The priority for each queue can be, in one embodiment, the same value as the credit value for each queue. In other embodiments, however, the priority is a scaled version of the credit value for each queue, and the priority can also be modified beyond a simple scaling depending on other characteristics, as is discussed further below.

Certain of the priorities 56 from a given ingress 102 are sent to the arbitration module 152 in this embodiment, as shown in FIG. 3A. In addition, each egress 104 sends information on the fullness state of its FIFOs to the arbitration module 152. The arbitration module 152 then determines the ingress 102 that will be connected to each egress 104 during a given timeslot (block 204 of FIG. 4A). The arbitration module 152 sends an output 58 back to the priority computation module 156, as seen in FIG. 3A. Output 58 can simply be a designation of which egress 104 the ingress 102 will have access to during a given timeslot. The metering module 154 can then determine which queue in the ingress 102 to service, based on the egress 104 to which the ingress 102 has access during the timeslot.

The selection of an ingress 102 for each egress 104 in the arbitration module 152 is based on priorities, and this selection process can be referred to as arbitration. Generally, the priorities 56 determine which ingress 102 to connect to which egress 104 during a given timeslot, and which queue within an ingress to service during that timeslot. In one embodiment, the ingress 102 with a queue that desires a given egress 104 with the greatest priority is chosen for connection to the given egress 104 during a timeslot. In addition, a queue within that selected ingress 102 that desires the egress 104 and has the greatest priority is the queue within that ingress 102 that is serviced during the timeslot. Some methods used for queue selection in various embodiments of the invention are discussed further below in connection with FIGS. 9-11. In any event, configuration of the shared link 10 for the timeslot in accordance with the ingress 102 to egress 104 mappings follows arbitration. A message containing instructions (not shown in Figures) is therefore sent to the shared link 108 each timeslot to indicate the mapping between ingress and egress that the shared link 108 should produce. The shared link 108 then establishes a connection between ingresses and egresses for the timeslot in accordance with the instructions.

In one embodiment of the invention, a maximum priority level is reserved for a queue with a packet contained therein that is larger than a single timeslot. FIG. 3B, for example, shows that packet 170 has a size that is larger than a given timeslot. In one embodiment of the invention, a connection over the shared link 108 of the system 100 is maintained for a sufficient period of time such that an entire packet that is larger than a single timeslot can be transferred continuously over the shared link 108 without interruption. Such a maintained connection ensures that a packet need not be segmented into multiple packets in an ingress 102 and then reassembled at an egress 104 after all of the segments of the packet are transmitted over the link 108. Such a system maximizes utilization of the shared link 108 by allowing the size of a timeslot to be set at an appropriate length of time. That is, the timeslot size for data transfer is set at a low enough level such that utilization of the shared link 108 is high. This method of the invention, however, also solves the segmentation and reassembly problem by maintaining single or multiple connections over the shared link 108 to transfer packets larger than a single timeslot.

A partial packet variable can be used by the system of the invention to denote such a packet that is too large for transfer across the shared link in a single timeslot Such a partial packet variable indicates that the current packet to be serviced in the queue is too large to be serviced in a single timeslot, and that a connection should be maintained over the shared link 108 for a sufficient number of timeslots to transfer the entire packet. The maximum priority level, therefore, can be allocated to a queue if such a partial packet variable is associated with the queue at a given time.

The queue manager 112 of FIG. 3A generally services the queues and sends updated messages regarding the state of the queues depending on the event(s) that takes place during a given timeslot. The queue manager 112, for example, sends a dequeue notification 64 to the meter update module 160 when a packet is sent from a queue. This is a dequeue event. The queue manager 112 also sends an enqueue notification 62 to the meter update module 160 when a packet is received and buffered within a given queue. This is an enqueue event FIG. 3A also depicts a dequeue request 60 being sent from the priority computation module 156 to the queue manager 112. This dequeue request 60 indicates the queue to be serviced in a given timeslot based on the arbitration process. The queue manager 112, therefore, can service the queue in accordance with the dequeue request 60.

An event generated by the queue manager 112, therefore, begins the series of computations discussed above, and causes an update of the credit value and possibly Qlength for a queue. A priority for each queue is then determined based on the credit value or other information, such as a partial packet variable, associated with the queue. A priority with which each ingress desires each egress is determined using the priority computation module 156 and arbitration module 152. These priorities generally determine an ingress to be associated with each egress for a given timeslot.

In an embodiment in which the functions of the metering module 154 and queue manager 112 are performed in hardware, the timing of the functions described above can be as follows for a timeslot size of about 200 nanoseconds. Arbitration and configuration of the link 108 are both performed on the basis of the fixed timeslots. Arbitration, however, preferably precedes configuration of the link 108 by a small number of timeslots due to latencies in the system. Thus, the arbitration module 152 can perform arbitration for about the first 100 nanoseconds of a timeslot, and then a message can be sent to each ingress 102 indicating the egress 104 with which it will communicate for a particular timeslot, which can be about 300-500 nanoseconds after the message is sent. Each ingress 102 will then respond to the arbiter chip 106 with updated priority information. In addition, each egress 104 can send information on the fullness state of its FIFOs. FIG. 2, for instance, depicts connections between the egresses 104 and the arbiter chip 106 over which such fullness state information may be sent. The actual configuration of the link 108 and transfer of packets takes place, therefore, a short time (300-500 nanoseconds in this embodiment) after the message containing the egress, for an ingress, is received by the ingress 102.

In one embodiment of the invention, the priorities for each queue are updated every timeslot and the guaranteed rates for each queue are updated less frequently. For example, the guaranteed rates can be updated every 100 timeslots. QoS guarantees for a system are determined over some discernable period of time that consists of more than one timeslot, so bandwidth allocation, which is controlled using the guaranteed rates, needs to be adequate on average over a given plurality of timeslots and not for a single or even a few timeslots.

FIG. 3A depicts data that flows between the modules of the system 100 during operation in accordance with one embodiment of the invention. The data will be messages or signals representing the information described above. The messages sent between the modules as described above contain only updated information from information sent in previous timeslots, thus eliminating duplicative data transfers and reducing the amount of information that is transferred between modules. In addition, a single message containing Qlengths 50 and priorities 56 will be sent to the arbitrator chip 106 from the ingress 102, rather than the separate messages shown in FIG. 3A. In addition, a single message containing an output egress 58 and updated guaranteed rates 52 can be sent from the arbitrator chip 106 to the ingress 102, rather than the separate messages shown in FIG. 3A.

Figure 4B:
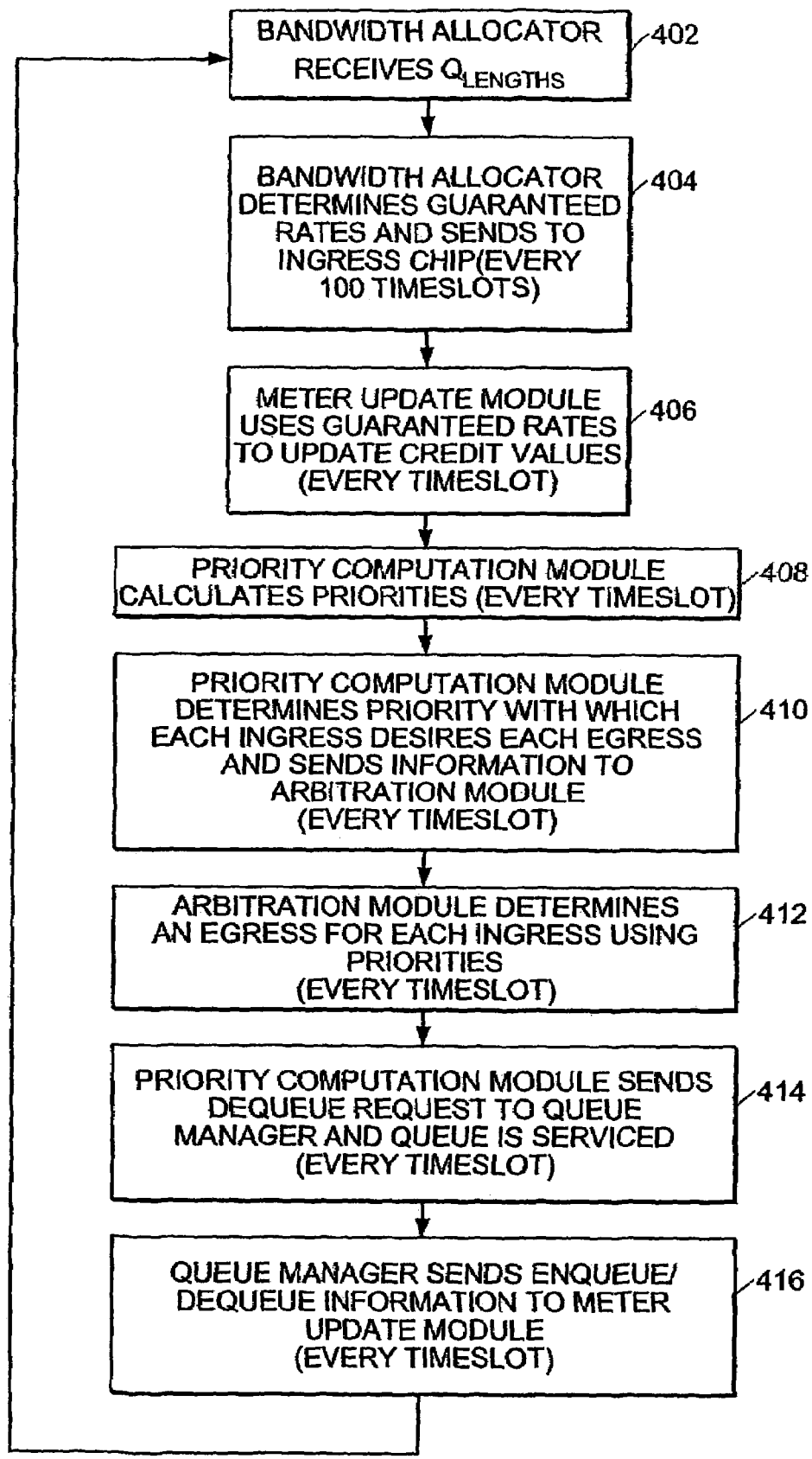
FIG. 4B is a flow chart showing one embodiment of the methods of the invention in greater detail than FIG. 4A.

To review, FIG. 4B is a flow chart showing one embodiment of the operation of the invention in greater detail than FIG. 4A. In this embodiment, the bandwidth allocator 150 receives Qlength information at block 402. At block 404, the bandwidth allocator 150 determines guaranteed rates for the queues and sends these guaranteed rates to the ingress chip 102. The guaranteed rate for each queue may be calculated in the bandwidth allocator 150 and sent to the ingress chip 102 once in every 100 timeslots in this embodiment At block 406, the meter update module 160 uses the guaranteed rate for each queue to update a credit value for the queue. This updating of credit values can take place every timeslot in this embodiment. At block 408, the priority computation module 156 calculates a priority based on the credit value or other information about the queue, such as whether a partial packet is present. This priority calculation can also take place every timeslot. At block 410, the priority computation module 156 determines a priority with which the ingress desires to communicate with each egress of the system or, in other embodiments, the priority computation module 156 selects a plurality of queues that might have the largest priority for each egress. In either event, information is sent to the arbitration module 152 indicating these priorities. This act can also take place each timeslot. At block 412, the arbitration module 152 uses the priorities to determine an ingress for each egress, and such a determination is performed every timeslot. At block 414, the priority computation module 156 sends a dequeue request to the queue manager 112 every timeslot in accordance with the egress selected for the ingress, and the queue manager services the appropriate queue. At block 416, the queue manager 112 sends enqueue/dequeue information to the meter update module 160, and then the process beginning at block 402 is repeated.

B. Methods for Calculating Guaranteed Rates

Figure 5:
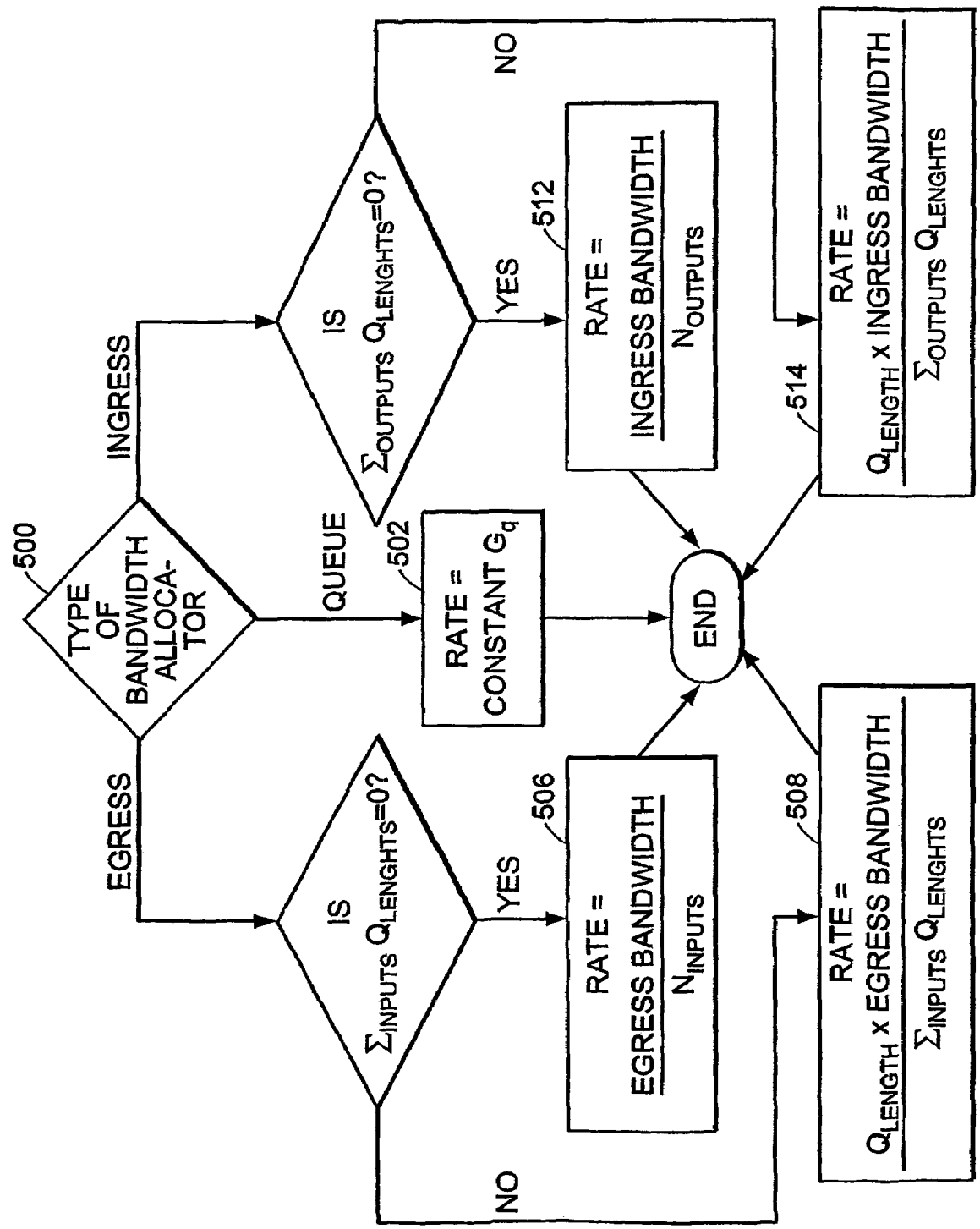
FIG. 5 is a flow chart illustrating one embodiment of the calculation of bandwidth rates for three different types of bandwidth allocation.

A number of methods can be used within the scope of the invention to calculate the guaranteed rates for the queues of the ingresses 102 of the system 100. Generally, the guaranteed rates are used to allocate bandwidth and, therefore, maintain QoS guarantees. Discussed herein are four methods for guaranteeing bandwidth: (1) guaranteeing bandwidth for a single queue, (2) guaranteeing bandwidth for an egress, (3) guaranteeing bandwidth for an ingress, and (4) guaranteeing bandwidth for a group of queues. FIG. 5 depicts the first three of these methods for guaranteeing bandwidth.

1. Guaranteeing Queue Bandwidth

To guarantee bandwidth for a particular queue Q within an ingress, the guaranteed rate for the queue is set to an appropriate value $g_q$, which can remain constant for a number of timeslots. Such a constant value $g_q$ guarantees that over any reasonably long period of time, the average bandwidth the queue obtains is $g_q$, provided that the flow into the queue has an arrival rate that is at least equal to $g_q$. In one example, for instance, the value $g_q$ can be set to a value of 0.25 Gbps to allocate a bandwidth rate of 0.25 Gbps to the queue over a reasonably long period of time. FIG. 5 depicts the act of setting the value $g_q$ in block 502.

In one embodiment that calculates guaranteed rates in hardware, the bandwidth allocator module 150 simply sets appropriate values in the rate registers to guarantee bandwidth for any given queue. The bandwidth allocator module 150 can limit the value of the rate $g_q$ to be no higher than the arrival rate for the particular queue, which ensures that an idle queue does not accumulate unreasonably large credit and possibly waste bandwidth.

2. Guaranteeing Bandwidth at an Egress

Figure 6A:
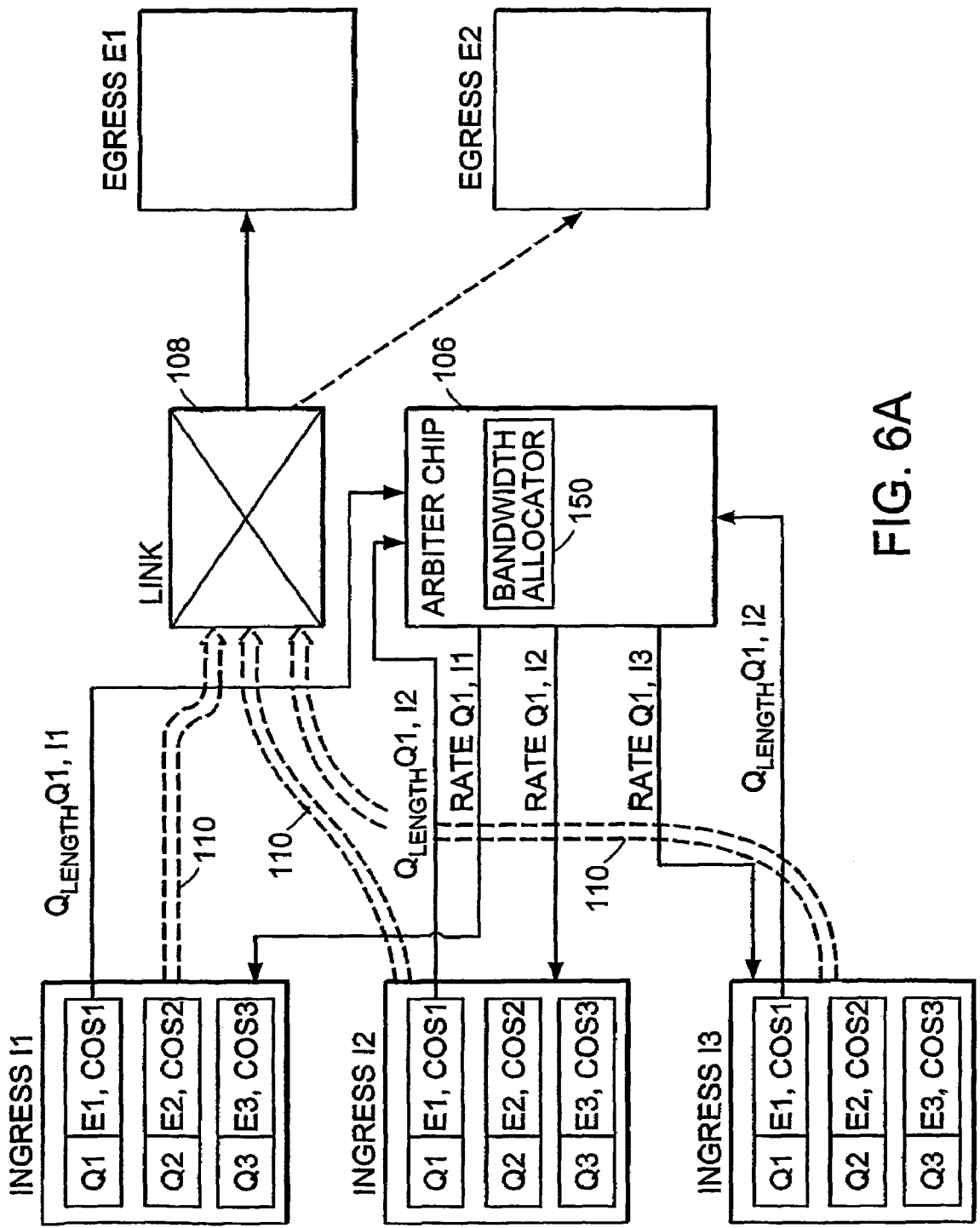
FIG. 6A is a block diagram illustrating one embodiment of bandwidth allocation at a single egress.

FIG. 6A exemplifies one embodiment of guaranteeing bandwidth for a particular egress E1. In such an embodiment, bandwidth for the single egress E1 is guaranteed so that packets from any of one or more ingresses I1, I2 can be transmitted to the egress E1. Ingress I1 of FIG. 6A contains three queues, queues Q1, Q2, Q3, and each queue is associated with a given COS and a given egress. For example, packets are, in this embodiment, buffered in queues depending not only on the COS for the packet, but also on the egress for which the packet is destined. Queue Q1 of FIG. 6A, for instance, is associated with egress E1 and has COS1. Queue Q2 is associated with egress E2 and has COS2, and queue Q3 is associated with egress E3 and has COS3. Ingress I2 and I3 are similarly set up with three queues Q1, Q2, Q3 having the same associations as the queues within ingress I1.

To calculate guaranteed rates in this embodiment of the invention, the queues associated with the same egress E1 and having the same COS communicate Qlengths to the bandwidth allocator module 150. In FIG. 6A, for example, queues Q1 in ingresses I1, I2, and I3 each communicate Qlengths to the bandwidth allocator module 150. Guaranteed rates for these three queues are then determined as a single subset or group. In order to determine the guaranteed rate for the queue, the guaranteed rate for queue Q in ingress i (that is, ingress I1, I2 or I3) destined for egress j (that is, egress E1, E2 or E3) is denoted as $g^i_{j,q}$. This rate $g^i_{j,q}$ can change with time. The method can guarantee bandwidth for an egress link by guaranteeing, for some egress j, bandwidth equaling $F_{j,q}=\Sigma_{i:inputs} g^i_{j,q}(t)$ averaged over a period of time. In this example, i can vary over all ingresses or over a subset of ingresses. Each $g^i_{j,q}(t)$ corresponds to the bandwidth allocated at time t to an associated queue Q with data destined for egress j, and including each queue Q, if any, in each of ingresses i. The system guarantees that $F_{j,q}$ worth of egress bandwidth which, at any given time, will be distributed over the different ingresses (that is, allocated to the queues Q within each ingress).

The Qlength for a queue Q in ingress i and destined for egress j can be denoted as $L^i_{j,q}(t)$. The values of these Qlengths are periodically communicated to the bandwidth allocator module 150. If $F_{j,q}$ is the bandwidth guaranteed at egress j for the COS corresponding to queue Q, then the guaranteed rates $g^i_{j,q}(t)$s can be initially set to be $F_{j,q}/N$, where N is the number of ingresses having such a queue Q (in this embodiment, there is one queue within each ingress bound for the egress and having the COS, although in other embodiments more than one queue Q with data bound for the egress and having the COS can be used). The guaranteed rates $g^i_{j,q}(t)$s can be reset or re-calculated depending on Qlengths $L^i_{j,q}(t)$ measured in subsequent timeslots as follows:

$$g^i_{j,q}(t) = \frac{(L^i_{j,q}(t) \times F_{j,q})}{\Sigma_{k:inputs} L^k_{j,q}(t)}$$

The inputs in this example are the number of ingresses N. If $\Sigma_{k:inputs} L^k_{j,q}(t)$ is 0 (that is, all queues Q are empty), the guaranteed rates $g^i_{j,q}(t)$s are set to $F_{j,q}/N$ for all ingresses i having a queue Q. Each updated guaranteed rate $g^i_{j,q}(t)$ is then communicated back to the corresponding ingress i. In a hardware embodiment, the rate registers for queues Q are then updated. In a software embodiment, guaranteed rate variables $g^i_{j,q}(t)$ for the queues Q are updated.

As a particular example using the embodiment of FIG. 6A, assume the Qlength $L^i_{j,q}(t)$ for queue Q1 in ingress I1 is 200 bytes, the bandwidth rate $F_{j,q}$ for the egress is 0.2 Gbps, and there are three ingresses with queues having a total Qlength $\Sigma_{k:inputs} L^k_{j,q}(t)$ equaling 2000 bytes. In this example, the guaranteed rate $g^i_{j,q}(t)$ for the queue Q1 is:

$$g^i_{j,q}(t) = \frac{(200 \text{ bytes} * 0.2 \text{ Gbps})}{2000 \text{ bytes}} = 0.02 \text{ Gbps}.$$

FIG. 5 depicts an act of setting the guaranteed rates to equal values in block 506 for each ingress if the $\Sigma_{k:inputs} L^k_{j,q}(t)$ is 0 as tested at block 504. Block 508 depicts an act of setting the guaranteed rates to an individual calculated value for each ingress if $\Sigma_{k:inputs} L^k_{j,q}(t)$ is not 0.

Figure 6B:
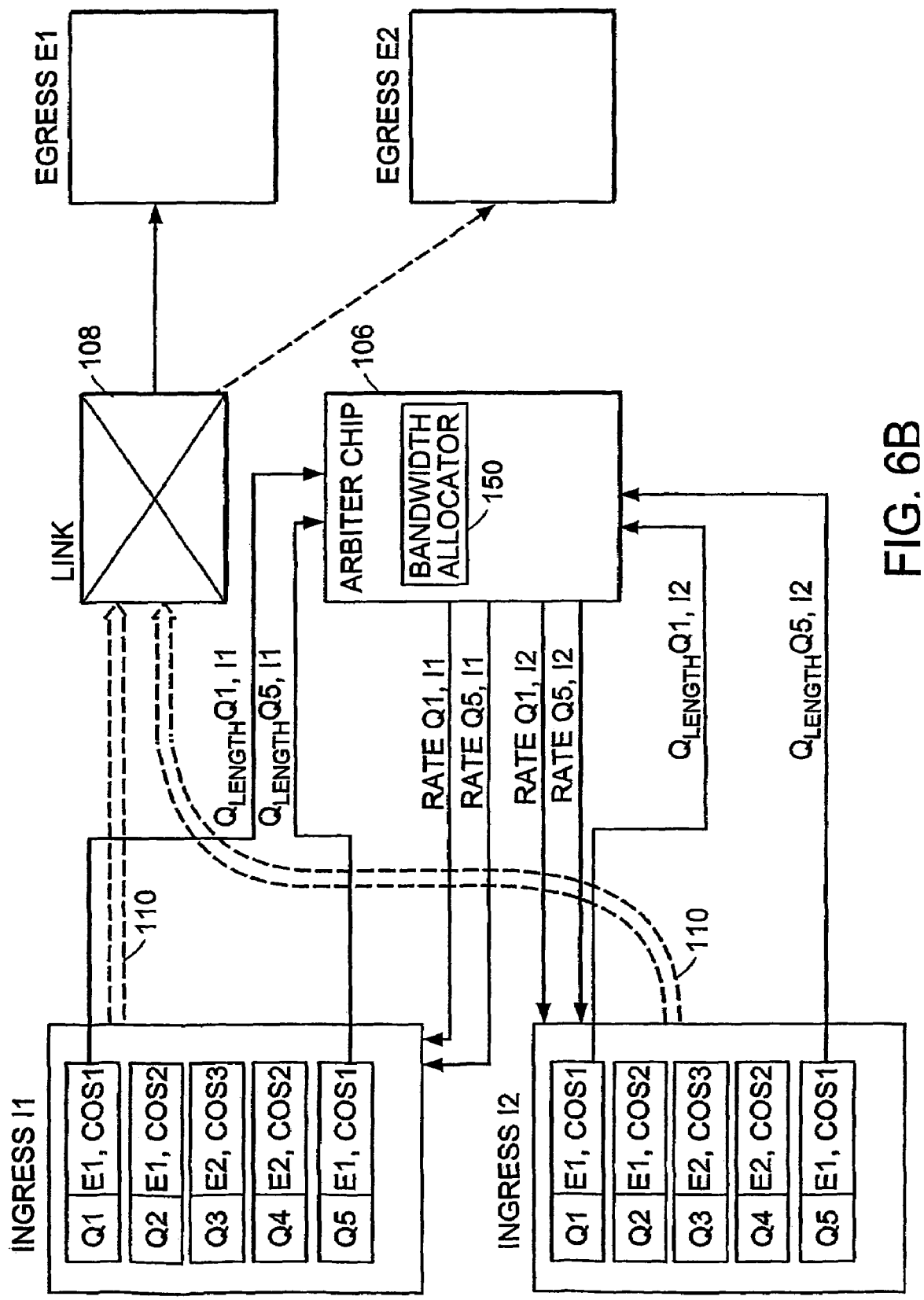
FIG. 6B is a block diagram illustrating a second embodiment of bandwidth allocation at a single egress.

In an alternative embodiment, depicted in FIG. 6B, more than one queue within each ingress has a given COS and has data bound for the same egress. Queue Q1 of FIG. 6B, for instance, is associated with egress E1 and has COS1. Queue Q5 is a second queue within ingress I1 that is associated with egress E1 and has COS1. Ingress I2 is similarly set up with five queues Q1, Q2, Q3, Q4, Q5 having the same associations as the queues within ingress I1. In such a case, the number N above will be the number of queues having a given COS and being bound for the same egress. For instance, in FIG. 6B, four queues have COS1 and are bound for egress E1 (two in ingress I1 and two in ingress I2). In such an embodiment, N=4 (the number of queues having the desired parameters) and not N=2 (the number of ingresses).

FIG. 6B also shows that an ingress I1, I2 can have queues with packets bound for the same egress, but having different COSs. FIG. 6B, for instance, shows that queue Q1 and queue Q2 are both bound for (have pockets destined for) egress E1, but have different COSs—COS1 for queue Q1 and COS2 for queue Q2. Only information from queues having the same COS is used in the calculations above. The number N of inputs in the calculations ($\Sigma_{k:inputs} L^k_{j,q}(t)$) for queues destined for egress E1, with COS1, in FIG. 6B, is therefore 4—i.e., queues Q1 and Q5 in each of ingresses I1 and I2. Queue Q2 in each ingress I1, I2 is not used for the calculations above due to the different COS. The egress output bandwidth $F_{j,q}$ is therefore associated with COS1 as well, and a separate egress output bandwidth amount can be associated with COS2.

The methods discussed above used Qlengths in order to calculate guaranteed rates. It should be noted that arrival rates can also be used to calculate guaranteed rates. In such an embodiment, arrival rate variables would be substituted in the equations and calculations above for Qlength variables in order to calculate guaranteed rates. Arrival rate information can be sent from the queue manager 112 (FIG. 3A) to the arbiter chip 106 in such an embodiment.

3. Guaranteeing Bandwidth at an Ingress

Figure 7A:
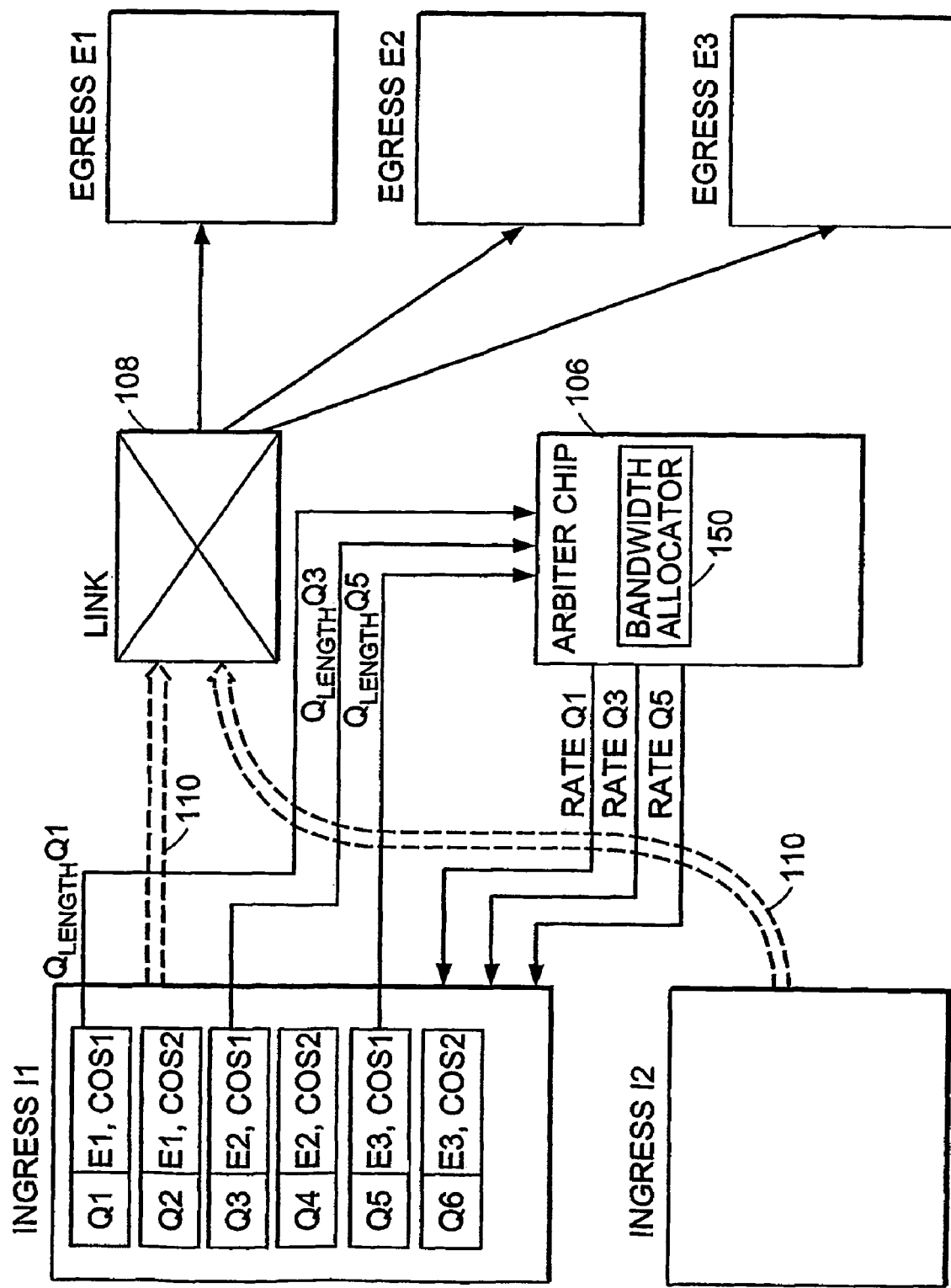
FIG. 7A is a block diagram illustrating one embodiment of bandwidth allocation at a single ingress.

FIG. 7A exemplifies one embodiment of guaranteeing bandwidth for a particular ingress I1. In such an embodiment, bandwidth for the single ingress I1 is guaranteed so that packets from the queues within ingress I1 can be communicated to any of the egresses E1, E2, E3. Ingress I1 of FIG. 7A contains six queues, queues Q1, Q2, Q3, Q4, Q5, Q6, and each queue is associated with a given COS. Queue Q1 of FIG. 7A, for instance, is associated with COS1. Queue Q2 is associated with COS2, and so forth. In this embodiment of guaranteeing bandwidth, the queues Q1, Q2, Q3 of each ingress I1, I2, I3 need not be associated with a single egress. For instance, queue Q1 having COS1 can have packets destined for any egress of the system. FIG. 7A depicts a packet in queue Q1 that is bound for egress E1, but the next packet in queue Q1 could be destined for a different egress. In another embodiment, however, a queue Q may be associated with a given egress so that all of the packets buffered in the queue Q are destined for that egress.

In this embodiment, the system and method guarantee bandwidth for a particular ingress. In this case, bandwidth equaling $E^i_q = \Sigma_{j:outputs} g^i_{j,q}(t)$ averaged over some time t is guaranteed for the ingress i (or a subset of queues within the ingress having a given COS). In this embodiment, bandwidth equaling $E^i_q$ is guaranteed for an ingress and such bandwidth $E^i_q$ can be distributed uniformly or non-uniformly over the different egresses j. The guaranteed rates $g^i_{j,q}(t)$s for the corresponding queues cannot be set to be constants which sum $E^i_q$, because at any given time, a particular queue may or may not have packets of data that are destined for an egress. In FIG. 7A, queues Q1, Q3, and Q5, which all have COS1, send Qlengths to the bandwidth allocator module 150, and rates for each of these queues are then determined as a group or subset and sent back to the ingress I1.

In this embodiment, guaranteed rates are set based on Qlengths, as in the egress bandwidth embodiment. The Qlength $L^i_{j,q}(t)$ is determined for each queue Q in a given COS corresponding to egress j in a given ingress I1. In this embodiment, each of these $L^i_{j,q}(t)$s can be locally available within a single ingress, unlike in the method for guaranteeing egress bandwidth. The guaranteed rates $g^i_{j,q}(t)$s can be initialized to $E^i_q/M$, where M is the number of queues having the given COS. In one embodiment, multiple queues within a single ingress can exist that are each associated with a given egress and have a given COS. In another embodiment, only a single queue Q can exist within an ingress that is associated with a given egress and has a given COS. In still other embodiments, the queues within an ingress can each have an associated COS, but the queues may not be associated with a particular egress. In any event, the guaranteed rates $g^i_{j,q}(t)$s can be reset or calculated depending on Qlengths $L^i_{j,q}(t)$ in subsequent timeslots as follows:

$$g^i_{j,q}(t) = \frac{(L^i_{j,q}(t) \times E^i_q)}{\Sigma_{k:outputs} L^k_{k,q}(t)}$$

for all j

If $\Sigma_{k:outputs} L^i_{k,q}(t)$ is 0, $g^i_{j,q}(t)$ is set to $E^i_q/M$ for all of the queues. Each updated guaranteed rate $g^i_{j,q}(t)$ is then communicated back to the corresponding ingress i. In a hardware embodiment, the rate registers for the queues Q are then updated. In a software embodiment, guaranteed rate variables $g^i_{j,q}(t)$ for the queues Q are updated.

As a particular example, for the embodiment of FIG. 7A, assume the Qlength $L^i_{j,q}(t)$ is 100 bytes, the bandwidth rate for the ingress is 0.5 Gbps, and the three queues having COS1 in ingress I1 have a total Qlength $\Sigma_{k:inputs} L^k_{j,q}(t)$ equaling 1000 bytes. In this example, the guaranteed rate $g^i_{j,q}(t)$ for the queue Q is:

$$g^i_{j,q}(t) = \frac{(100 \text{ bytes} * 0.5 \text{ Gbps})}{1000 \text{ bytes}} = 0.05 \text{ Gbps}.$$

In this example using FIG. 7A, ingress I1 has three queues Q1, Q3, Q5 having COS1, although each queue Q1, Q3, Q5 is associated with a different egress. Queue Q1, for instance, is associated with egress E1, and queue Q3 is associated with egress E2. In another embodiment, however, ingress I1 could have multiple queues having the same COS and being associated with the same egress. In still another embodiment, the queues within ingress I1 may not be associated with a particular egress, but may have an associated COS.

FIG. 5 depicts an act of setting the guaranteed rates to equal values in block 512 for each egress if the $\Sigma_{k:outputs} L^i_{k,q}(t)$, tested at block 510, is 0. Block 514 depicts an act of setting the guaranteed rates to an individual calculated value for each queue if $\Sigma_{k:outputs} L^i_{k,q}(t)$ is not 0.

The methods discussed above used Qlengths in order to calculate guaranteed rates. It should be noted that arrival rates can also be used to calculate guaranteed rates. In such an embodiment, arrival rate variables would be substituted in the equations and calculations above for Qlength variables in order to calculate guaranteed rates. Arrival rate information can be sent from the queue manager 112 (FIG. 3A) to the arbiter chip 106 in such an embodiment.

4. Guaranteeing Bandwidth for a Group of Queues

Figure 7B:
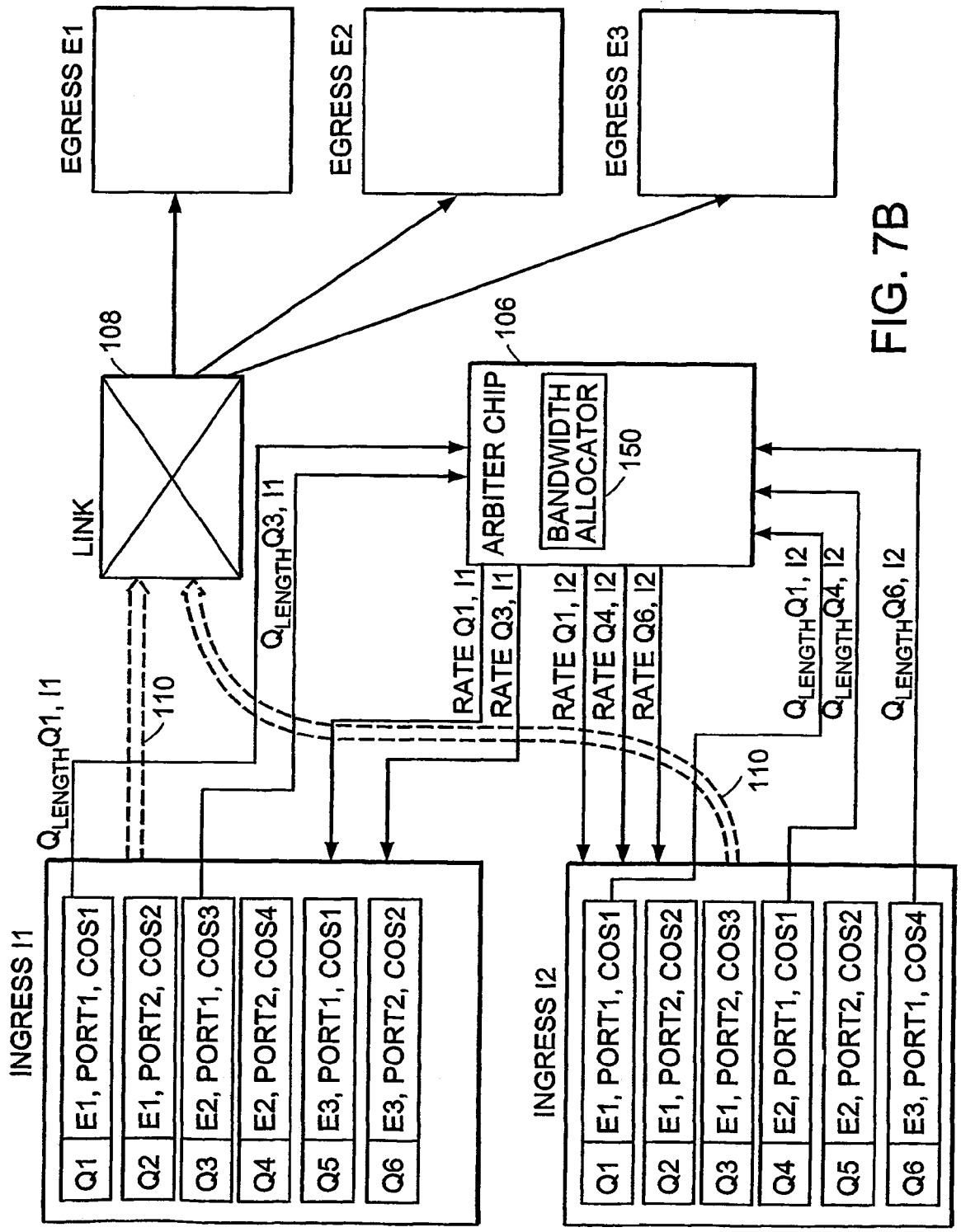
FIG. 7B is a block diagram illustrating one embodiment of bandwidth allocation for a group of queues.

FIG. 7B exemplifies one embodiment of guaranteeing bandwidth for a group of queues, which can be any arbitrary group of queues. In such an embodiment, bandwidth can be guaranteed for a group of queues, where the queues can be in different ingresses and can have packets destined for different egresses. In addition, the queues in the group can have the same COS or different COSs. The total bandwidth amount can be apportioned to the queues based on the Qlengths of the queues or, in other embodiments, based on the arrival rate of data to the queues.

Referring to FIG. 7B as an example of this embodiment, a group of queues for which bandwidth is guaranteed includes queues Q1 and Q3 in ingress I1 and queues Q1, Q4, and Q6 in ingress I2. The queues in this group are not bound for the same egress and do not have the same COS. Queue Q1 in ingress I1, for example, contains data bound for port 1 of egress E1 and has COS1, and queue Q3 in ingress I1 contains data bound for port 1 of egress E2 and has COS3. Queue Q1 in ingress I2 contains data bound for port 1 of egress E1 and has COS 1. Queues Q4 and Q6 in ingress I2, which are also in the group of queues, also have arbitrary characteristics in this embodiment.

To calculate guaranteed rates in this embodiment of the invention, the queues associated with the arbitrary group of queues communicate Qlengths to the bandwidth allocator module 150. In FIG. 7B, for example, queues Q1 and Q3 in ingress I1 and queues Q1, Q4, and Q6 in ingress I2 each communicate Qlengths to the bandwidth allocator module 150. Guaranteed rates for these five queues are then determined as a single subset or group. In order to determine the guaranteed rate for each queue, the guaranteed rate for queue Q in the group of N queues is denoted as $g^i_q$. This rate $g^i_q$ can change with time. The method can guarantee bandwidth for the group of queues by guaranteeing bandwidth equaling $F_{ARB} = \Sigma_{i:inputs} g^i_q(t)$ averaged over a period of time. In this example, i varies over each of the queues in the group of N queues. Each $g^i_q(t)$ corresponds to the bandwidth allocated at time t to an associated queue Q. The system guarantees $F_{ARB}$ worth of bandwidth which, at any given time, will be distributed over the different queues in the group of N queues.

The Qlength for a queue Q in the group of N queues can be denoted as $L^i_q(t)$. The values of these Qlengths are periodically communicated to the bandwidth allocator module 150. If $F_{ARB}$ is the bandwidth guaranteed for the group of N queues, then the guaranteed rates $g^i_q(t)$s can be initially set to be $F_{ARB}/N$, where N is the number of queues in the group of queues. The guaranteed rates $g^i_q(t)$s for each queue can be reset or re-calculated depending on Qlengths $L^i_q(t)$ measured in subsequent timeslots as follows:

$$g^i_q(t) = \frac{(L^i_q(t) \times F_{ARB})}{\Sigma_{i:inputs} L^i_q(t)}$$

for each queue

The inputs in this example vary over the number N of queues in the group. If $\Sigma_{i:inputs} L^i_q(t)$ is 0 (that is, all queues Q in the group are empty), the guaranteed rates $g^i_q(t)$s are set to $F_{ARB}/N$ for all queues in the group. Each updated guaranteed rate $g^i_q(t)$ is then communicated back to the ingress corresponding to the queue, as depicted in FIG. 7B. In a hardware embodiment, the rate registers for queues Q are then updated. In a software embodiment, guaranteed rate variables $g^i_q(t)$ for the queues Q are updated.

As a particular example using the embodiment of FIG. 7B, assume the Qlength $L^i_q(t)$ for queue Q1 in ingress I1 is 800 bytes, the bandwidth rate $F_{ARB}$ for the group of queues is 0.8 Gbps, and there are five queues in the group having a total Qlength $\Sigma_{i:inputs} L^i_q(t)$ equaling 2000 bytes. In this example, the guaranteed rate $g^i_q(t)$ for the queue Q1 in ingress I1 is:

$$g_q^i(t) = \frac{(800 \text{ bytes} * 0.8 \text{ Gbps})}{2000 \text{ bytes}} = 0.32 \text{ Gbps}.$$

The methods discussed above used Qlengths in order to calculate guaranteed rates. It should be noted that arrival rates can also be used to calculate guaranteed rates. In such an embodiment, arrival rate variables would be substituted in the equations and calculations above for Qlength variables in order to calculate guaranteed rates. Arrival rate information can be sent from the queue manager 112 (FIG. 3A) to the arbiter chip 106 in such an embodiment.

C. Methods for Updating Credit Values

Figure 8:
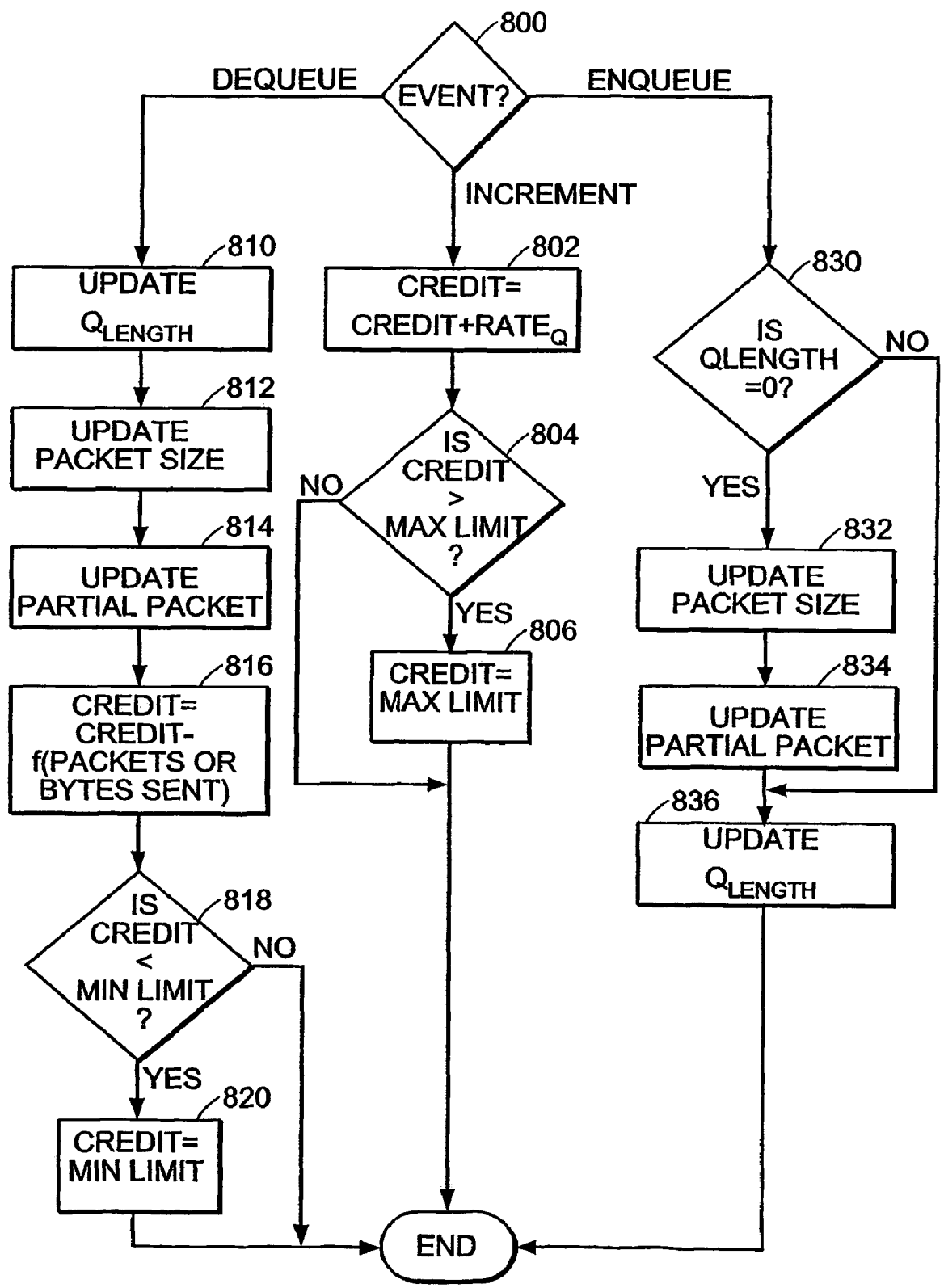
FIG. 8 is a flow chart showing the adjustment of credit values used for bandwidth allocation in one embodiment of the invention.

One method for updating credit values for a given queue is depicted in block form in FIG. 8 for one embodiment of the invention. As described above, credit values generally increase for queues that are not serviced after each timeslot, therefore increasing the priority for those queues. Similarly, a serviced queue has an associated credit value decreased after the timeslot in which it is serviced so that the priority for that queue will decrease. In one embodiment, an initial value of each credit value, before operation of the invention, can be 0. The credit values for each queue of an ingress are generally updated each timeslot. After a queue is serviced, therefore, the credit value can be decreased from its current value (initially 0, but after operation begins, the current value of the credit value can be a large positive number or a negative number of large magnitude). The credit values can be updated in the meter update module 160 of the metering module 154 using the guaranteed rates 52 for the queues received from the bandwidth allocator module 150. In a steady-state system, the credit values for all of the queues add up to 0, which indicates that the queues are, on average, receiving desired bandwidth rates.

FIG. 8 depicts three possible events 800 that can occur, in one embodiment of the invention, during a given timeslot for a single queue within an ingress. An enqueue event can take place, meaning that a packet of data enters the queue. A dequeue event can take place, meaning that the queue has been serviced and a packet has been sent from the queue to the shared link. The third event is an increment event, which takes place during each timeslot in this embodiment. During a single timeslot, each of the three events in FIG. 8 can occur for a queue. For an increment event in this embodiment, the credit value is incremented by adding the guaranteed rate for the queue to the current credit value, as denoted by block 802 in FIG. 8. As denoted by blocks 804 and 806, if the new credit value is greater than a maximum limit for the queue (which can be based on the COS for the queue), the credit value is reset to the maximum limit for the queue. In one embodiment, an increment event occurs during each timeslot, so that each queue is incremented after each timeslot by its associated credit value.

Maximum limits on the credit values for queues prevents the credit values for queues having low COSs from growing too large. The priority for these queues can therefore also be capped. This ensures that the queues having low COSs will not be serviced at the same rate as queues having larger COSs.

If an event is a dequeue event, in this embodiment, the Qlength for the queue becomes smaller, and the Qlength for the queue can therefore be updated, as denoted by block 810. A new packet or packets will be at the head of the queue for service, and the size of the packet or packets can be updated, as denoted by block 812. In addition, if the new packet is larger than a given timeslot, a partial packet variable will be updated, as denoted by block 814. The partial packet variable indicates that, once started, communication to the shared link 108 should be maintained for the queue so that a packet larger than a single timeslot can be transferred across the shared link 108 without interruption. The credit value for the queue can then be decreased, as indicated by block 816. In one embodiment, the credit value is decreased by a function of the number of packets sent (that is, if more than one packet is sent during a timeslot) or bytes sent during the timeslot. In another embodiment, the credit value can be decreased by the amount of data (that is, in bytes or bits) that can be sent in a single timeslot. As such, the credit value is appropriately decreased so that bandwidth can be re-allocated for the other queues. In this embodiment, an increment event will also occur after the timeslot, such that the credit value is decreased for the dequeue event by the number of bytes that can be sent during a single timeslot (for example), and then increased by the guaranteed rate for the queue for the increment event. If the updated credit value is smaller than a minimum limit for the queue, which can be based on the COS for the queue, as tested at block 818, the credit value is reset to the minimum limit for the queue at block 820.

A minimum credit value is used to insure that a priority for a queue having a certain COS does not become too small. This prevents the queue from not being serviced frequently enough.

If an event is an enqueue event, a determination is made whether the Qlength for the queue was indicated as being zero (block 830). If the current Qlength of the queue is zero, then no packet existed within the queue during the previous timeslot. Because a packet entered the queue during the enqueue event, the packet size for the queue will need to be updated along with the partial packet variable for the queue (blocks 832 and 834). If the Qlength is not zero, a packet exists at the head of the queue (and existed in the previous timeslot as well), and a packet size and partial packet variable were already set during a previous timeslot. Block 836 of FIG. 8 indicates an act of updating the Qlength based on the enqueued packet of data. An increment event can also occur during the same timeslot as an enqueue event, as may a dequeue event.

D. Methods for Determining Queue Priorities

After credit values are updated for the queues, a priority for each queue in each ingress indicating a need to connect to an egress can be determined. As described above and below in more detail, these priorities can be used to compute a mapping of the shared link 108 between ingresses and egresses.

In one embodiment, priorities for queues can be scaled on a sixteen point level between 0 and 15. In this embodiment, the priorities for queues are determined from the credit values for the queues on this scaled level. For instance, if the credit value for a given queue has accrued to the level of 1 Gbps, a priority for the queue can be set to a level of 5, and if the credit value for a second queue is 2 Gbps, a priority for the second queue can be set to a level of 10. In this embodiment, a negative credit value will be set to a low priority, such as 0 or 1. In such an embodiment, a queue having a greatest priority is the queue that will be serviced during a given timeslot. The conversion of credit values to priorities can minimize the amount of data that will be sent from an ingress 102 to the arbiter chip 106. A credit value, for instance, can be over 1,000,000,000 in size, while a corresponding priority for such a credit value can be 10. If a priority is scaled on a sixteen point scale, a four-bit register can be used for the priority in a hardware embodiment.

As described above in connection with updating credit values, credit values for certain queues can be limited depending on a COS for the queues. For example, a queue with COS1 can be limited to a certain minimum credit value that can correspond to a minimum priority level of 5 on a sixteen point scale. Similarly, a queue with COS8 can be limited to a certain maximum credit value that can correspond to a maximum priority level of 12 on a sixteen point scale.

In one embodiment using a sixteen point priority scale from 0 to 15, a priority of 0 is reserved for a queue that is empty and hence has no packet to transfer over the shared link 108. Similarly, a maximum priority of 15 can be reserved for partial packets. As explained above, if a packet is too large for transfer over the shared link 108 in a single timeslot, a partial packet variable is associated with the queue. When the queue having the packet eventually obtains a connection to the shared link 108, a maximum priority will be set for that queue in the next timeslot such that the queue will continue to be connected to the shared link 108 and the packet can be continuously transferred over the shared link 108 without segmentation and reassembly.

Table 1 below indicates another embodiment of the conversion from a credit value to a priority for a queue. In this embodiment, the conversion from a credit value to a priority can involve more than a simple scaling from a credit value to a priority. Other queue information, such as whether the queue is empty and whether the queue has been serviced too much, can also be considered. Table 1, therefore, includes a number of conditions along with a priority that can be assigned to a queue if one of those conditions is met. In this embodiment, each queue has a credit value C(q) associated with it, as described above. The scaling factor S is a constant used to scale larger credit values into smaller priorities.

TABLE 1

| CONDITION | PRIORITY FOR QUEUE |
| --- | --- |
| 1. If the packet is a partial packet from the previous timeslot (that is, the queue has a partial packet variable associated with it). | MAXPRI |
| 2. If the queue is an expedited forwarding queue AND the credit value C(q) for the queue is greater than 0. | MAXPRI − 1 |
| 3. If the queue is not an expedited forwarding queue AND the credit value C(q) for the queue is greater than 0. | MIN [(C(q)/S), MAXPRI − 1] |
| 4. If the queue is not empty AND if the condition below is not met, a minimum priority that can be set (that is, the priority can be larger as determined above). | 1 |
| 5. If the queue is empty, OR if C(q) < $S_{limit}$ | 0 |

As condition 1 in Table 1 indicates, in this embodiment, the priority for a queue is set to a maximum priority MAXPRI if the packet in the queue is a partial packet from the previous timeslot. On a sixteen point scale from 0 to 15, MAXPRI is 15. Such a partial packet that is assigned MAXPRI in one embodiment, has a partial packet variable associated with it. Conversely, a queue that is empty is assigned a priority of 0, as condition 5 in Table 1 indicates. This is a minimum priority that will ensure that a queue having the priority of 0 will not be serviced during the given timeslot.

Condition 5 in Table 1 has a second condition that, if met, sets the priority to 0 (or a minimum priority). If the credit value C(q) is less than a shaping limit $S_{limit}$ for the queue, the priority will be set to 0. The shaping limit $S_{limit}$ is a parameter used to scale the priority so that a queue doesn't receive too much bandwidth over a period of time. A guaranteed rate is, for instance, the minimum rate $F_{min}$ that a queue should receive. A maximum rate $F_{max}$, on the other hand, can be the maximum rate that a queue should receive. Of course, the bandwidth received over a discernable length of time greater than a single timeslot should be measured to determine if these rates are achieved. For instance, a time period of 50 microseconds can be the time period over which a minimum rate $F_{min}$ should be achieved and a maximum rate $F_{max}$ should not be exceeded. A time period of 50 microseconds can equal, for instance, 100 timeslots of 500 nanoseconds each. In this embodiment, the shaping limit $S_{limit}$ can be set to be:

$$S_{limit} = (F_{min} - F_{max}) * \text{time period}.$$

Because $F_{min}$ will be smaller than $F_{max}$, the shaping limit $S_{limit}$ will generally be a negative number. A credit value becomes negative only when its queue has been serviced recently and the queue, therefore, has already received more than its guaranteed bandwidth at that point in time. The larger in magnitude that a negative credit value becomes, the more the corresponding queue has been serviced, and the more that queue has exceeded its guaranteed bandwidth. In such cases, the priority for the queue can be forced to be 0 by using the shaping limit $S_{limit}$, as indicated in condition 5 in Table 1. If the credit value C(q), converted to bytes per time period, is less than the shaping limit $S_{limit}$, the priority will be set to 0 in this embodiment, thus ensuring that the queue will not be serviced in a subsequent timeslot. If the converted credit value C(q) is less than the shaping limit $S_{limit}$, the queue has already exceeded the maximum bandwidth that will be allowed over the time period, and hence the priority will be set to 0. In this manner, the maximum bandwidth that can be achieved for a queue can be restricted over a certain time period. If, however, it is desired to allow a queue to exceed its maximum bandwidth over a period of time, the credit value for the queue can be periodically set to 0 so that a negative credit value that is large in magnitude will not keep the queue from being serviced frequently.

With regarding to condition 2 in Table 1, an ingress can be set up with a queue that is an expedited forwarding queue. Such a queue is a queue that is serviced before other queues of the ingress regardless of credit value. An expedited forwarding queue can be used in an ingress to ensure that certain packets are transferred as quickly as possible. In such a case, the packet will be buffered in the expedited forwarding queue. As Table 1 indicates for condition 2, a priority of MAXPRI-1 is set to such an expedited forwarding queue if it contains a packet (that is, if the queue is not empty). A priority of MAXPRI-1 ensures that the queue will likely be serviced as long as no queue desiring the same egress has a priority of MAXPRI. Similarly, two queues may have MAXPRI-1, in which case a tie between the two queues will need to be broken, as described below. On a sixteen point scale from 0 to 15, MAXPRI-1 is 14.

Condition 3 in Table 1 indicates the typical condition in which the credit value is scaled into a priority. Generally, if a queue does not have a partial packet, the queue is not an expedited forwarding queue, and the credit value C(q) for the queue is not negative, then the priority for the queue can be calculated by dividing the credit value C(q) for the queue by the scaling factor S. The priority can be a rounded version of the credit value C(q) divided by the scaling factor, so that a number of 6.4 would be rounded to a priority of 6. The use of a scaling factor S implies a linear scaling. The scaling, however, need not be linear, but can be nonlinear as well. In addition, a look-up table or a series of "if, then" determinations can be used to determine a priority based on a credit value. In order to keep the priority within the bounds of an established scale (such as a 0 to 15 scale), the priority for the queue can be set to a maximum level of MAXPRI-1 if it does not contain a partial packet. Condition 3 in Table 1, therefore, indicates taking the smaller of MAXPRI-1 or C(q)/S for the priority for such a queue.

Condition 4 in Table 1 indicates that a priority for a queue will be a minimum priority if the queue is not empty and if condition 5 does not apply (that is, the credit value C(q) is not less than the shaping limit $S_{limit}$). Table 1 indicates this minimum priority as being 1. The priority for the queue can, of course, be larger if the credit value C(q) is positive, as indicated by condition 3. If the queue is not empty and if condition 5 does not exist, however, condition 4 indicates that a minimum priority is set.

The credit value of a queue can vary widely. It could be as large as tens of millions or a negative quantity whose magnitude is tens of millions. As an example of the conversion from a credit value to a priority, assume the guaranteed rate for a queue is 0.0005 Gbps, or 500,000 bytes per second (bps). With each passing timeslot for which the queue is not serviced, therefore, the credit value associated with the queue increases by 500,000 bps. The scaling factor S, in this example, is 1,000,000. If the credit value for the queue grows to a value of 12,000,000, therefore, the priority for the queue will be set to 12 (assuming the queue is not an expedited forwarding queue and the queue does not contain a partial packet). If the credit value for the queue is -5,000,000, the priority for the queue will be set to 1 (unless condition 1, 2 or 5 applies from Table 1).

E. Methods for Queue Service Selection

Figure 9:
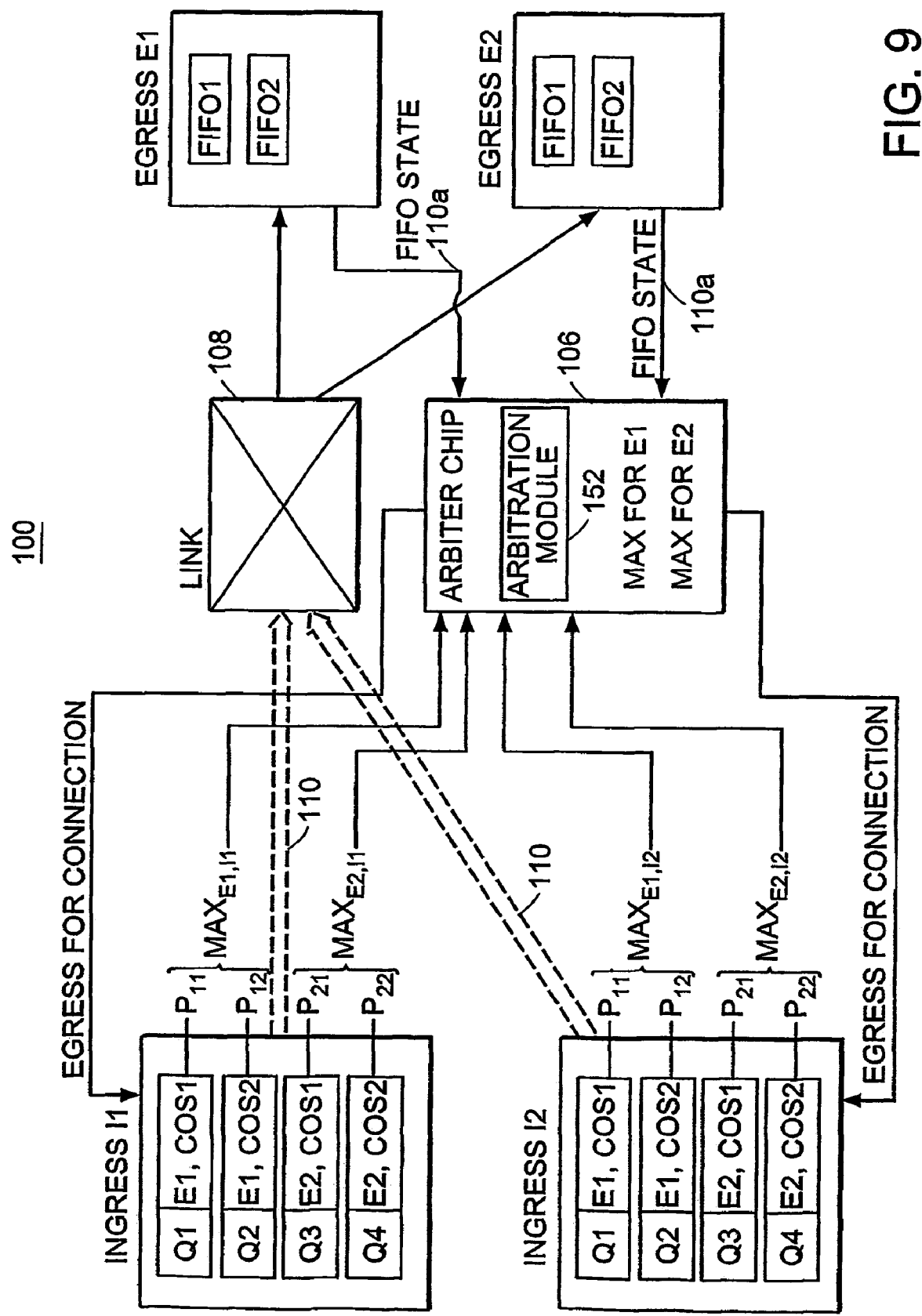
FIG. 9 is a block diagram illustrating one embodiment of a queue selection scheme of the invention.

After a priority for each queue has been determined, the plurality of priorities is used to compute a mapping over the shared link 108 between the ingresses and egresses for a timeslot. FIG. 9 illustrates one simplified embodiment of selecting queues for service during a given timeslot FIG. 9 depicts two ingresses I1, I2, each of which has four queues. Depicted within each queue Q1, Q2, Q3, Q4 is a COS for the queue and a packet at the head of the queue. Each of the packets at the head of the queues contend for access to the shared link 108 during any given timeslot. In FIG. 9, for example, a packet destined for egress E1 is at the head of each queue Q1, a packet destined for egress E1 is also at the head of each queue Q2, and packets destined for egress E2 are at the head of each of queues Q3 and Q4.

FIG. 9 shows that priorities P11, P12, P21, and P22 have been computed for each of the queues Q1, Q2, Q3, Q4. In one embodiment, priority computation and queue selection take place every timeslot. At any given moment, therefore, a priority for a packet (or packets) at the head of a queue is akin to a priority for the queue itself because only the packet (or packets) at the head of the queue contends for access to the shared link 108 during a given timeslot. Throughout this specification, therefore, the instantaneous priority for a queue can be considered to be synonymous with a priority for a packet (or packets) at the head of the queue. In addition, a priority that is "instantaneous" refers to a priority for a given timeslot, which is an instant in time having some finite duration, and this priority may or may not change in timeslots that follow the given timeslot.

In FIG. 9, two ingresses I1 and I2, each having four queues Q1, Q2, Q3, Q4 are connectable to egresses E1 and E2 over the shared link 108. A two-level process for selection of a mapping between ingress and egress can be used as follows. In a first level a first instantaneous priority is selected for each group of queues in each ingress bound for a particular egress. This first level of selection can be performed within an ingress by the priority computation module 156 (FIG. 3A). For ingress I1 in FIG. 9, for instance, queue Q1 and queue Q2 both contain packets bound for egress E1. Based on the priority of these two queues Q1, Q2, one of these queues, having a first priority, is selected. In one embodiment, for instance, the queue having the higher priority associated therewith is selected. Similarly, in ingress I2, queues Q1 and Q2 both contain packets bound for egress E1, and a queue having a first priority from these two queues is also selected. It is worth noting that for queue selection, the COS for the queue can, in one embodiment, be ignored. The COS for the queue has, presumably, already been used to determine the priority for the queue. FIG. 9 also depicts the selection of a queue (having a first priority) having a packet destined for egress E2 in each ingress I1, I2. An indication of the queue number, ingress number, and priority level for each selected queue having a first priority in the first level is sent to the arbitration module 152 of the arbiter chip 106, as depicted in FIG. 9.

The second level of the queue selection in the two-level process takes place within the arbitration module 152. In this second level, a queue having a second priority is selected from the subset of queues having the first priorities received from the ingresses I1, I2. This second level of selection reviews the priority with which each ingress desires to connect with each egress and selects an egress for each ingress. As an example, using FIG. 9, assume queue Q1 has a priority P11=12 in ingress I1 and is selected within ingress I1 in a first level of selection for egress E1. Similarly, assume queue Q2 has a priority P12=7 in ingress I2 and is selected within ingress I2 in a first level of selection for egress E1. These two queues, priorities, and desired egresses are communicated to the arbitration module 152. In the second level of queue selection, the arbitration module 152 selects from these queues (which both contain packets destined for egress E1) a queue having a second priority. In one embodiment, for instance, the queue having the highest priority is selected for the egress. In this example, for instance, queue Q1 from ingress I1 has a higher priority for egress E1 than does queue Q2 from ingress I2 (i.e., a priority of 12 is higher than a priority of 7). This second level, therefore, determines the egress to which each ingress is connected during a given timeslot.

A N×M matrix of priorities can therefore be used in the arbitration module 152, where N is the number of ingresses and M is the number of egresses. For instance, the arbitrator module 152 can receive from each ingress the maximum priority with which the ingress desires each egress, as determined in the first level of selection. These priorities then fill the N×M matrix so that an ingress can be selected for each egress in the second level of selection. As depicted in FIG. 9, a message is sent to each ingress notifying that ingress of the egress, if any, to which it will have access during the timeslot. The ingress can then connect the queue it selected for the determined egress to the shared link 108 for packet transfer.

During the second level of queue selection, it should be noted that a single ingress can contain more than one queue having packets destined for different egresses and that have the highest priority for those egresses. Because, in some embodiments, a single queue of an ingress can only be connected to a single egress during a timeslot (a physical limitation in this embodiment of the invention), each of these queues will not be selected for access to the shared link 108. In such a situation, the queue having the highest priority is selected from the queues within the ingress and the egress for that queue is determined according to that highest priority. The ingress will then be unavailable for at least that timeslot for connection to other egresses, and the priorities from that ingress can be ignored for the remainder of the queue selections in the second level of selection for this timeslot. As an example from FIG. 9, assume queue Q1 from ingress I1 has priority P11=12 and is the highest priority for egress E1 for all of the ingresses within the arbitration module 152. Further, assume queue Q3 from ingress I1 has priority P21=10 and is the highest priority for egress E2 for all of the ingresses. In this example, queue Q1 from ingress I1 has a greater priority than queue Q3 from ingress I1 (I2 is greater than 10), and hence queue Q1 from ingress I1 will be selected for access to egress E1. The remaining queues from ingress I1 will not be available for connection to the shared link 108 during that given timeslot. Queue Q3 from ingress I1 will therefore not be available for the given timeslot, and a different queue from a different ingress will have to be selected for egress E2.

A tie-breaking method may be needed when two or more priorities are equal in either an ingress or in the arbitration module 152. Such tie-breaking can be done using a random selection, a round robin selection or, in other embodiments, using the least recently serviced queue. As an example using FIG. 9, assume queue Q1 within ingress I1 has priority P11=10 for egress E1 and queue Q2 within ingress I1 also has priority P12=10 for egress E1. In a tie-breaking procedure using a least recently serviced queue, the queue Q1 or Q2 that has been serviced least recently will be chosen. A similar procedure can be followed within the arbitration module 152 for tie-breaking of priorities from ingresses for egresses. In such a case, for instance, the ingress that has been least recently connected to the egress will be serviced or, in another embodiment, the queue from either ingress that has been least recently serviced will be selected.

FIG. 9 depicts a message containing the state of the FIFOs within each egress E1, E2 being sent over lines 110a to the arbiter chip 106. The state of the FIFOs, which can be an indication of how full the FIFOs of an egress are, can be used within the arbitration module 152 to map ingresses with egresses. A priority for a queue can be reduced if the FIFO within the egress to which the queue wishes to communicate is full. In other words, if the FIFO of an egress is full, no packet will be sent to that FIFO, and if all of the FIFOs of an egress are full, a packet will not be sent to the egress in the timeslot, and the priority of a queue having a packet desiring that egress will be correspondingly reduced so that the queue will not gain access to the shared link 108 during the next timeslot. In this embodiment, the priority for queues bound for an egress with full FIFOs can be reduced within the arbitration module 152 on the arbiter chip 106, although the FIFO states can also be sent to the ingresses in other embodiments. In another embodiment, priorities are not actually reduced for queues having packets bound for an egress with full FIFOs, but instead the FIFO state can simply be used to ensure that no packets are sent to the egress while the FIFOs of the egress are full. In other words, an egress with full FIFOs is disregarded, and a FIFO port of an egress that is full is also disregarded. In this embodiment, no ingress gains access to the egress with full FIFOs during the given timeslot.

Another embodiment for selecting the queue to service can involve a three-level process for selection of a mapping between ingress and egress. The three-level process of queue selection can be used where packets of data specify an egress and a port within the egress with which connection is desired. FIG. 9, for instance, depicts ports FIFO1 and FIFO2 within each of egresses E1 and E2. Packets of data within the ingresses can each specify a particular egress and also a particular port within that egress with which communication is desired.

Figure 10:
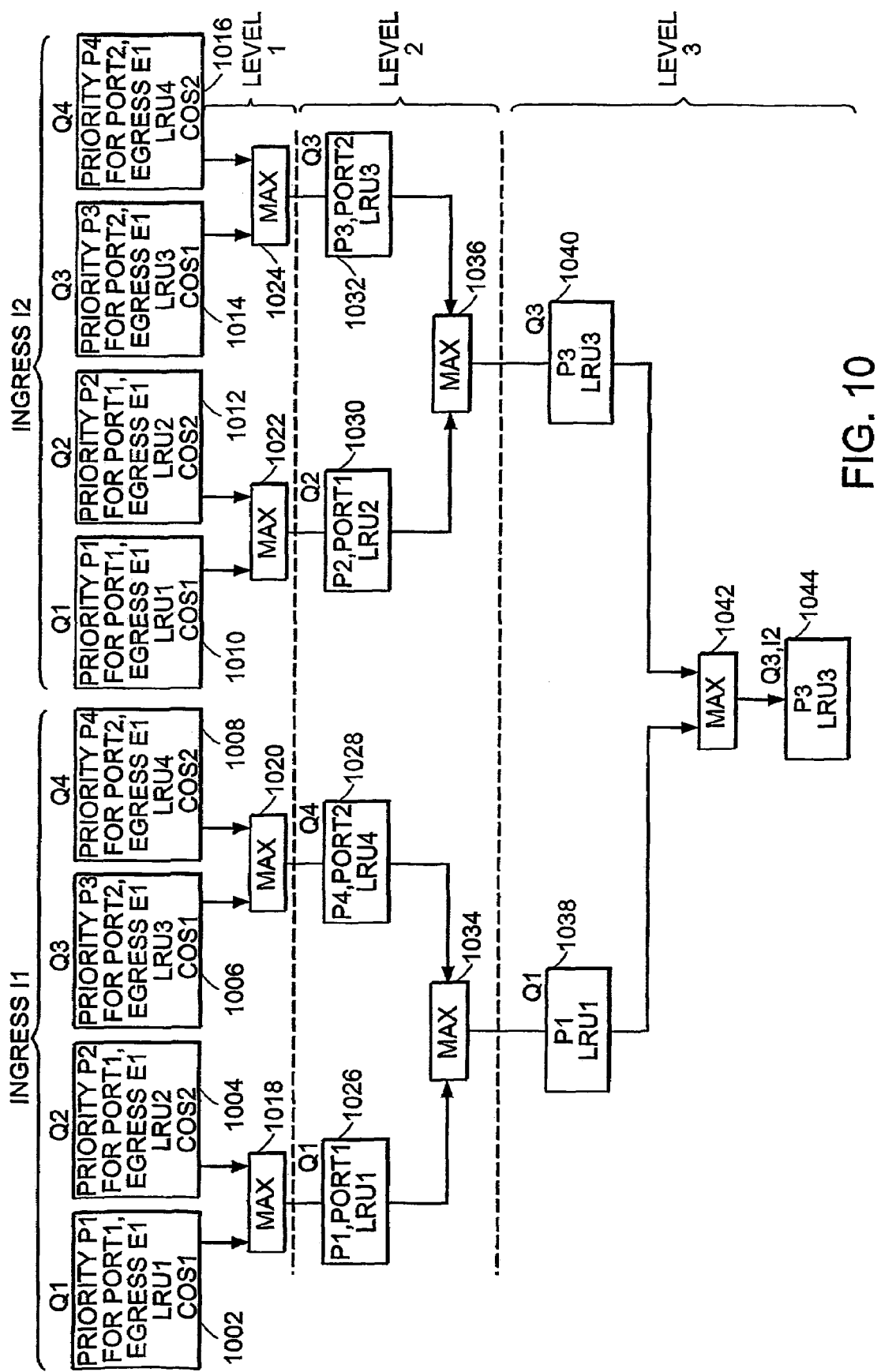
FIG. 10 is a flow chart illustrating a second embodiment of a queue selection method.

FIG. 10 is a decision tree block diagram illustrating levels of selection in a three-level process for queue selection. In the three-level process for queue selection, a first level of selection involves selecting, within each ingress, a queue from each group of queues bound for a particular port of a particular egress. In other words, a queue having a first priority is selected from those queues within an ingress bound for the same port of the same egress, and the first priority can be the highest priority for the group of queues. This selection can be from among queues having different COSs.

FIG. 10 depicts two ingresses I1, I2, each having four queues, with each queue in this depiction having packets bound for the same egress. Within ingress I1, for example, block 1002 indicates that queue Q1 has priority P1 and seeks to communicate with port 1 of egress E1. Similarly, block 1004 indicates that and queue Q2 has priority P2 and also seeks to connect with port 1 of egress E1. Note that queues Q1 and Q2 can have different COSs associated therewith. FIG. 10, for instance, depicts COS1 for queue Q1 and COS2 for queue Q2. In this example, queue Q1 or queue Q2 (which are both bound for the same port of the same egress) is selected in the first level of selection at block 1018. Specifically, in this embodiment, the queue having the highest priority is selected at this first level—queue Q1 in FIG. 10 (block 1026 shows this selection). FIG. 10 depicts a similar decision tree in which queue Q4 in ingress I1 is selected at block 1028 from between queue Q3 and queue Q4 (block 1020), both of which seek to communicate with port 2 of the same egress. A similar decision tree is depicted in FIG. 10 within ingress I2. Specifically, queues Q2 and Q3 are selected at blocks 1030 and 1032 in the first level within ingress I2.

A second level of selection in a three-level process involves selecting, within each ingress or within the arbitration module 152, a queue having a second priority from among the queues selected in the first level—that is, from the queues having first priorities. In other words, the second level involves selecting a queue for each ingress from those queues that seek to communicate with different ports of the same egress. If this second level is performed within the arbitration module 152, the fullness state of the FIFOs can be used so that a queue seeking connection to a full FIFO will not be selected. FIG. 10 shows for ingress I1 the selection in the first level of queue Q1 bound for port 1 (block 1026) and queue Q4 bound for port 2 (block 1028) of the same egress. The system then selects between these two queues in the second level at block 1034, based on the priorities of these queues, and FIG. 10 depicts the selection of queue Q1 bound for port 1 in this second level at block 1038. Specifically, queue Q1 is selected because priority P1 for queue Q1 is higher than priority P4 for queue Q4. Similarly, queue Q3 within ingress I2 is selected at block 1040 in the second level from a comparison between queue Q2 and queue Q3 at block 1036.

The third and final level of selection in a three-level process involves selecting an ingress (from queues having second priorities) for each egress such that no egress is connected to more than one ingress. Such a third level is performed in the arbitration module 152 and not within an ingress such that priorities with which each ingress desires each egress may be present. In other words, for each group of queues having second priorities and being bound for a particular egress, a queue is selected such that each egress is connected to only a single ingress. In one embodiment, the queue having the highest priority is selected.

Referring to FIG. 10, queue Q1 within ingress I1 and queue Q3 within ingress I2 were selected in the second level at blocks 1038 and 1040. A selection is made based on a comparison of the priorities (priority P1 and priority P3) of these two queues at block 1042. In FIG. 10, queue Q3 has been selected in this third level at block 1044. Because queue Q3 is within ingress I2, ingress I2 is connected to the egress in this embodiment, and queue Q3 is the queue that is serviced. It should be noted that FIG. 10 depicts a simplified procedure in which only two ingresses are present and all of the depicted queues are bound for the same egress. More generally, at the third level of selection, for instance, ingresses are selected for each of a plurality of egresses. Also, because a single ingress can have two or more queues with the highest priority for two or more egresses, the queue from this ingress having the highest priority will be chosen for communication to the egress, leaving the other queues within that ingress to contend for communication in subsequent timeslots.

FIG. 10 also shows the information that can be used to break a tie at any of the three levels of selection. Each queue of FIG. 10 has associated therewith a least recently used (LRU) number. The LRU number is a variable that indicates a length of time since the queue was last serviced or a scaled number that generally indicates how long the queue has gone since being serviced. The LRU number can also represent the position in a total ordering of the queues, where the ordering is based on increasing lengths of time since each queue was last serviced. For instance, queue Q1 of ingress I1 has LRU1 (block 1002) and queue Q2 has LRU2 (block 1004). If the priority P1 of queue Q1 is the same as the priority P2 of queue Q2 at block 1018, the LRU numbers can be used to break the tie in that level of selection. Thus, if a comparison between LRU1 from queue Q1 and LRU2 from queue Q2 in block 1018 indicates that queue Q1 has gone longer since being serviced, queue Q1 will be selected in the first level of selection. The LRU number can also be sent with each queue and priority selected in the second level from an ingress to the arbitration module 152 so that ties can be broken in the arbitration module 152 using the least recently used (LRU) information. The arbitration module 152 can also store its own LRU information regarding which egress port was selected and when each ingress was connected to each egress.

Figure 11:
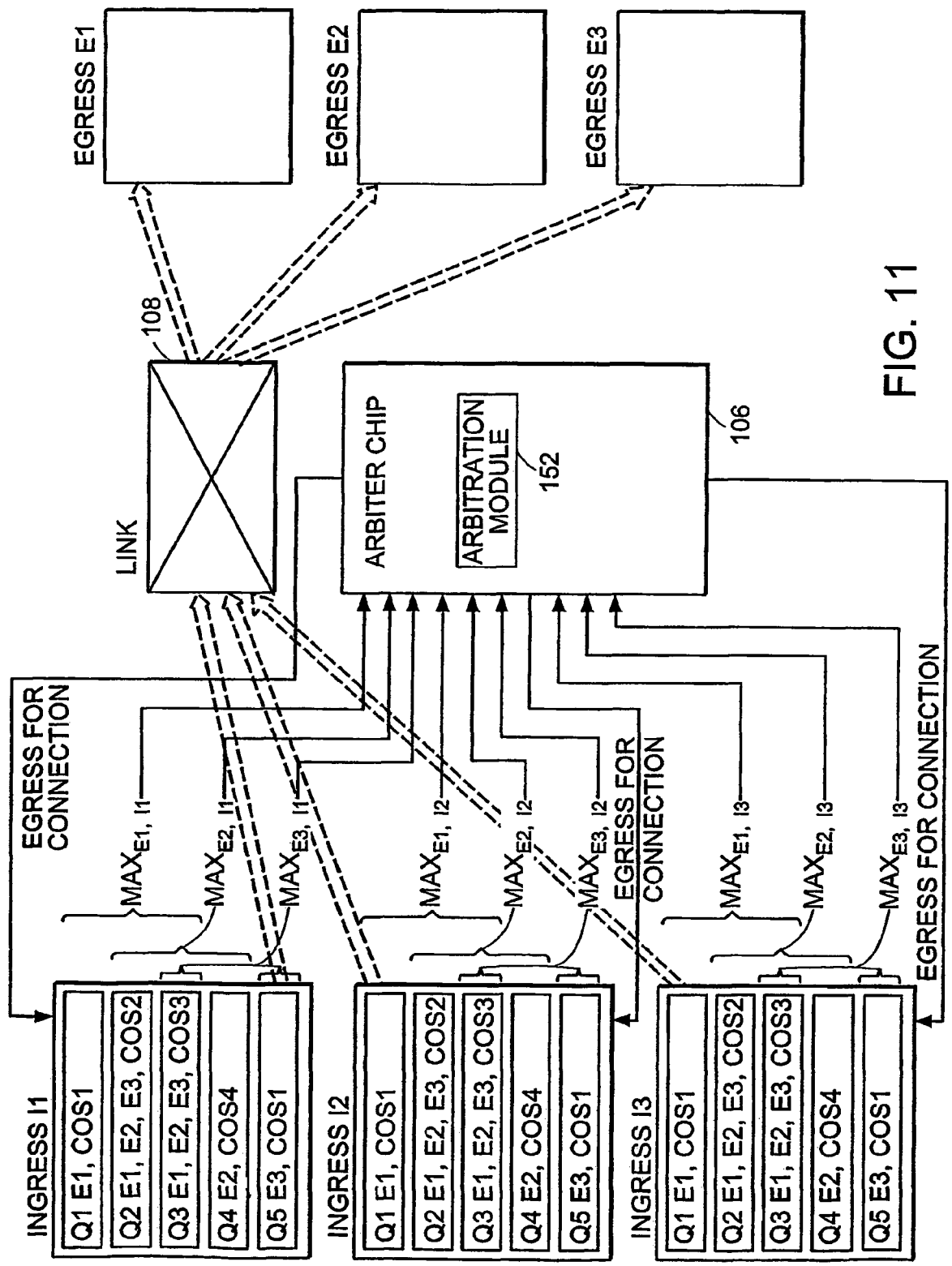
FIG. 11 is a block diagram of another embodiment of a queue selection scheme.

FIG. 11 illustrates another embodiment of a queue selection procedure using a block diagram of the system 100 in accordance with one embodiment of the invention. In this embodiment of the invention, a queue within an ingress can be reserved for packets that are bound for more than one egress. Such packets are referred to as "multicast" packets throughout this specification, and queues containing these packets can be referred to as "multicast" queues. Queue Q2 in each of ingresses I1, I2, and I3 in FIG. 11, for instance, is bound for egresses E1, E2, and E3. Packets queued in queue Q2, therefore, will be bound for two or more of egresses E1, E2, and E3. One packet in queue Q2 can be bound for egresses E1, E2, and E3, while another packet in queue Q2 can be bound for egresses E1 and E3. In the embodiment of FIG. 11, if a queue having a packet that is bound for more than one egress is selected for communication over the shared link 108, that queue can be connected to more than one egress during a single timeslot. The shared link 108, therefore, can map a single ingress in a timeslot to more than one egress in this embodiment. If the number of ingresses is the same as the number of egresses, at least one of the ingresses would not be connected to the shared link 108 in that timeslot.

The selection scheme can vary when multicast queues are used. In one embodiment, a queue in an ingress having multicast packets is only selected for communication across the shared link 108 when the queue has the maximum priority for each egress associated with the multicast queue. In such an embodiment, for instance, queue Q2 in ingress I1 of FIG. 11 can have the maximum priority for egress E1 and E2, and still not be selected for communication across the shared link 108 because queue Q2 does not have the maximum priority for egress E3. In another embodiment, only the packet at the head of the queue is reviewed to map ingresses to egresses. For instance, if queue Q2 in ingress I1 of FIG. 11 contains a packet at the head of the queue that is bound for only egresses E1 and E2, then queue Q2 win be selected if it has the maximum priority for egress E1 and E2 regardless of whether queue Q2's priority for egress E3 is the maximum priority. Another embodiment can be where a multicast queue is selected for information transfer if it has the maximum priority for only a single egress. This embodiment may, however, not use bandwidth efficiently because the queue would be selected for multiple egresses without having the maximum priority for each egress.

Referring to FIG. 11, an example of a queue selection scheme using multicast packets can be described. In FIG. 11, two or three rounds of selection can be used as described above in connection with FIGS. 9 and 10. In a three-level selection scheme, the first level of selection can be performed within each ingress, the second level can be performed within each ingress or within the arbitration module 152, and the third level of selection can be performed within the arbitration module 152. Each ingress I1, I2, I3 of FIG. 11 contains the same type of queues. Within each ingress, a first level of selection can choose a queue from each group of queues bound for a particular port of a particular egress. Within the arbitration module 152, a second level of selection can involve choosing a queue for each ingress from those queues that seek to communicate with different ports of the same egress. A third and final level of selection, performed within the arbitration module 152, can then involve selecting an ingress for each egress.

FIG. 11 depicts a two-level selection scheme. For ingress I1 of FIG. 11, queues Q1, Q2, and Q3 can each contain packets bound for egress E1. A queue having a maximum priority is therefore chosen from these three queues. Similarly, queues Q2, Q3, and Q4 can contain packets bound for egress E2, and so a queue having a maximum priority is selected from these queues. In addition, queues Q3 and Q5 can contain packets destined for egress E3, and so a maximum priority is selected from these queues. Similar selections are performed for each of ingresses I2 and I3. The arbitration module 152 can then select an ingress for each egress. In one embodiment, for instance, ingress I1 can be selected for each of egress E1, E2, and E3. If this is the case, ingresses I1 and I2 will be idle during the given timeslot. Queue Q2 or Q3 in ingress It can therefore be connected to each of egresses E1, E2, and E3 in this embodiment. In a second embodiment, ingress I1 can be connected to egresses E1 and E2, ingress I2 can be idle, and ingress I3 can be connected to egress E3 during a given timeslot.

In one embodiment, a multicast queue can send the packet or packets to each of the queues with which it is associated when the multicast queue is selected for communication, regardless of whether the packet or packets are destined for each of the egresses. For instance, in FIG. 11, queue Q3 of ingress I2 can be selected for information transfer to each of the egresses E1, E2, and E3. One packet in queue Q3 of ingress I2, however, may only be bound for egresses E1 and E2. In one embodiment, this packet would be sent to each of the three egresses E1, E2, and E3, and then egress E3 would disregard the packet because the packet would not contain header information indicating that it belongs in egress E3.

Any references to greater and lessor, front and back, right and left, top and bottom, upper and lower, and horizontal and vertical are intended for convenience of description, not to limit the present invention or its components to any one relational, positional or spatial orientation. All dimensions of the components in the attached Figures may vary with a potential design and the intended use of an embodiment of the invention without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. A method for selecting a packet for transmission across a shared link, comprising: determining a priority for a first-out packet in each of a plurality of queues within each of a plurality of ingresses; for each group of first-out packets within the queues of each ingress which are destined for a particular egress, selecting a first-out packet having a first priority; for each subset of selected first-out packets having first priorities and being destined for the particular egress, selecting a first-out packet having a second priority; and transmitting from at least one ingress across the shared link the selected first-out packet having the second priority.

2. A method for selecting a queue for service across a shared link, comprising: determining a priority for each queue within a plurality of ingresses, wherein the priority is instantaneous for a given timeslot for data transfer; for each group of queues within the plurality of ingresses having packets destined for a particular egress, selecting a queue having a first priority; and servicing the selected queue having the first priority for each group across the shared link in the given timeslot.

3. A method for selecting a queue for service across a shared link, comprising: determining a priority for each queue within a plurality of ingresses, wherein the priority is instantaneous for a given timeslot for data transfer; for each group of queues within each ingress having packets destined for a particular egress, selecting a queue having a first priority; for each subset of selected queues having first priorities and having packets destined for the particular egress, selecting a queue having a second priority; and servicing the selected queue having the second priority for each subset across the shared link in the given timeslot.

4. The method of claim 3, wherein selecting a queue having a first priority is carried out within each ingress.

5. The method of claim 4, wherein selecting a queue having a second priority is carried out within an arbitration module.

6. The method of claim 5, wherein selecting a queue having a first priority comprises selecting the queue having the highest priority.

7. The method of claim 6, wherein selecting a queue having a second priority comprises selecting the queue having the highest priority.

8. The method of claim 7, wherein a tie between two or more queues having the same highest priority is broken by selecting from the two or more tied queues the queue that has been least recently serviced across the shared link.

9. The method of claim 7, wherein a tie between two or more queues having the same highest priority is broken by randomly selecting a queue from the two or more tied queues.

10. The method of claim 7, wherein a tie between two or more queues having the same highest priority is broken by using a round-robin selection from the two or more tied queues.

11. The method of claim 3, further comprising: ascertaining the size of a first-out packet in each queue; if the size of the first-out packet in any queue is too large for transmission across the shared link in a single timeslot, assigning its queue a maximum priority for at least one timeslot immediately following the given timeslot if its queue is the selected queue having the second priority; and selecting the queue having the maximum priority for service for the timeslot immediately following the given timeslot.

12. The method of claim 3, further comprising updating the priority for each queue by: decrementing the priority of the queue if the queue is serviced in the given timeslot; and incrementing the priority of the queue after the given timeslot.

13. A system for selecting a queue for service across a shared link, comprising: a metering module within an ingress to: (a) determine a priority for each queue within the ingress, wherein the priority is instantaneous for a given timeslot for data transfer, and (b) for each group of queues within the ingress having packets destined for a particular egress, select a queue having a first priority; and an arbitration module to select a queue having a second priority from each subset of selected queues having first priorities and having packets destined for the particular egress, the selected queue having the second priority being the queue for service across the shared link in the given timeslot.

14. A computer-readable medium storing instructions that direct a microprocessor to: determine a priority for each queue within a plurality of ingresses, wherein the priority is instantaneous for a given timeslot for data transfer; for each group of queues within each ingress having packets destined for a particular egress, select a queue having a first priority; for each subset of selected queues having first priorities and having packets destined for the particular egress, select a queue having a second priority; and service the selected queue having the second priority for each subset across the shared link in the given timeslot.

15. A system for selecting a queue for service across a shared link, comprising: means for determining a priority for each queue within a plurality of ingresses, wherein the priority is instantaneous for a given timeslot for data transfer; means for selecting a queue having a first priority for each group of queues within each ingress having packets destined for a particular egress; means for selecting a queue having a second priority for each subset of selected queues having first priorities and having packets destined for the particular egress; and means for servicing the selected queue having the second priority for each subset across the shared link in the given timeslot.

16. A method for selection of a queue for service across a shared link, wherein each queue has a priority for data transfer that is instantaneous for a given timeslot, comprising: receiving from each ingress information regarding at least one queue having a first priority selected from each group of queues within each ingress having packets destined for a particular egress; selecting a queue having a second priority from each subset of selected queues having first priorities and having packets destined for the particular egress; and selecting the queue having the second priority for service across the shared link in the given timeslot.

17. The method of claim 16, wherein receiving from each ingress, selecting a queue having a second priority, and selecting the queue having the second priority for service are carried out within an arbiter chip.

18. The method of claim 16, further comprising sending to each ingress information regarding the particular egress to which the ingress will be connected for service during the given timeslot.

19. An apparatus for selection of a queue for service across a shared link, wherein each queue has a priority for data transfer that is instantaneous for a given timeslot, comprising: a memory storing a program; a processor in communication with the memory; in which the processor is directed by the program to: receive from each ingress information regarding at least one queue having a first priority selected from each group of queues within each ingress having packets destined for a particular egress; select a queue having a second priority from each subset of selected queues having first priorities and having packets destined for the particular egress; and select the queue having the second priority for service across the shared link in the given timeslot.

20. A computer-readable medium for selection of a queue for service across a shared link, wherein each queue has a priority that is instantaneous for a given timeslot for data transfer, the computer-readable medium storing instructions that direct a microprocessor to: receive from each ingress information regarding at least one queue having a first priority selected from each group of queues within each ingress having packets destined for a particular egress; select a queue having a second priority from each subset of selected queues having first priorities and having packets destined for the particular egress; and select the queue having the second priority for service across the shared link in the given timeslot.

21. A method for selecting a queue for service across a shared link, comprising: determining a priority for each queue within a plurality of ingresses, wherein the priority is instantaneous for a given timeslot for data transfer; within each ingress, for each group of queues having packets destined for a particular port of a particular egress, selecting a queue having a first priority; within an arbiter chip, for each subset of selected queues having first priorities and having packets destined for the same particular egress, selecting a queue having a second priority; within the arbiter chip, for each subset of selected queues from the plurality of ingresses having second priorities and having packets destined for the same particular egress, selecting a queue having a third priority; and servicing the selected queue having the third priority for each subset across the shared link in the given timeslot.

22. The method of claim 21, wherein selecting a queue having a first priority includes selecting from queues having varying classes of service.

23. The method of claim 22, wherein selecting a queue having a second priority includes selecting from queues having packets bound for varying ports of the same particular egress.

24. The method of claim 23, wherein selecting a queue having a second priority includes using information regarding the fullness state of the ports of the same particular egress.

25. A computer-readable medium storing instructions that direct a microprocessor to: determine a priority for each queue within a plurality of ingresses, wherein the priority is instantaneous for a given timeslot for data transfer; within each ingress, for each group of queues having packets destined for a particular port of a particular egress, select a queue having a first priority; within an arbiter chip, for each subset of selected queues having first priorities and having packets destined for the same particular egress, select a queue having a second priority; within the arbiter chip, for each subset of selected queues from the plurality of ingresses having second priorities and having packets destined for the same particular egress, select a queue having a third priority; and service the selected queue having the third priority for each subset across the shared link in the given timeslot.

26. A system for selecting a queue for service across a shared link, comprising: means for determining a priority for each queue within a plurality of ingresses, wherein the priority is instantaneous for a given timeslot for data transfer; means for, within each ingress, for each group of queues having packets destined for a particular port of a particular egress, selecting a queue having a first priority; means for, within an arbiter chip, for each subset of selected queues having first priorities and having packets destined for the same particular egress, selecting a queue having a second priority; means for, within the arbiter chip, for each subset of selected queues from the plurality of ingresses having second priorities and having packets destined for the same particular egress, selecting a queue having a third priority; and means for servicing the selected queue having the third priority for each subset across the shared link in the given timeslot.

27. A method for apportioning bandwidth across a shared link, comprising: maintaining queue metric information for each queue of a group of queues; calculating a guaranteed rate for each queue based on the queue metric information and a guaranteed bandwidth amount for the group of queues; adjusting a credit value associated with each queue by: adjusting the credit value of the queue by an appropriate amount if the queue is serviced in a given timeslot; and adjusting the credit value of the queue by an amount based on the guaranteed rate after the given timeslot; and using queue state information selected from one or more of the group consisting of the credit value, partial packet information, a shaping limit, and an indication of whether the queue is empty, to determine a priority for the queue, the priority acting to apportion bandwidth.

28. The method of claim 27, wherein the queue metric information comprises queue length information.

29. The method of claim 27, wherein the queue metric information comprises queue arrival rate information.

30. The method of claim 27, further comprising determining whether to service each queue based on the priority of each queue and priorities of other queues.

31. The method of claim 27, wherein the credit value is the priority for the queue.

32. The method of claim 27, wherein using queue state information includes scaling the credit value into the priority for the queue, wherein a scale size for priorities is substantially smaller than a scale size for credit values.

33. The method of claim 27, wherein adjusting the credit value of the queue by an amount based on the guaranteed rate includes incrementing the credit value by the guaranteed rate for the queue.

34. The method of claim 27, wherein adjusting the credit value of the queue by an appropriate amount if the queue is serviced in a timeslot comprises decrementing the credit value by the appropriate amount.

35. The method of claim 34, wherein the appropriate amount is a function of the number of packets transmitted across the shared link from the queue since the last adjustment.

36. The method of claim 34, wherein the appropriate amount is a function of the number of bytes transmitted across the shared link from the queue since the last adjustment.

37. The method of claim 27, wherein using queue state information includes setting the priority to a minimum value if the credit value is less than the shaping limit for the queue.

38. The method of claim 37, wherein the shaping limit restricts the bandwidth received by the queue to a maximum amount.

39. The method of claim 27, wherein using queue state information includes setting the priority to a maximum level if a partial packet variable is present for the queue.

40. A method for guaranteeing bandwidth for an egress of a shared link system, comprising: maintaining information regarding a queue metric for each queue in a group of queues with packets destined for the egress, wherein the queues reside within one or more ingresses of the shared link system; calculating a guaranteed rate for each queue in the group of queues based on the queue metric information and a guaranteed bandwidth amount for the egress; and using the guaranteed rate to calculate a credit value for each queue in the group of queues, wherein the credit values are used to allocate bandwidth.

41. The method of claim 40, wherein using the guaranteed rate to calculate a credit value for each queue comprises: adjusting the credit value associated with each queue by: decrementing the credit value by an appropriate amount if the queue is serviced in a given timeslot; and incrementing the credit value by an amount based on the guaranteed rate after the given timeslot.

42. The method of claim 40, wherein each queue in the subset of queues has a class of service associated therewith, and wherein the class of service of each queue in the group is the same.

43. The method of claim 42, wherein calculating a guaranteed rate for each queue comprises: determining as the guaranteed rate for each queue an amount equal to the product of the queue metric for the queue and the guaranteed bandwidth amount for the egress divided by the sum of the queue metrics for the queues in the group.

44. The method of claim 43, wherein the queue metric information comprises queue length information.

45. A method for guaranteeing bandwidth for an ingress of a shared link system, comprising: maintaining information regarding a queue metric for each queue in a group of queues within the ingress, wherein packets within the queues are destined for one or more egresses of the shared link system; calculating a guaranteed rate for each queue in the group of queues based on the queue metric information and a guaranteed bandwidth amount for the ingress; and using the guaranteed rate to calculate a credit value for each queue in the group of queues, wherein the credit values are used to allocate bandwidth.

46. The method of claim 45, wherein using the guaranteed rate to calculate a credit value comprises: adjusting the credit value associated with each queue by: decrementing the credit value of the queue by an appropriate amount if the queue is serviced in a given timeslot; and incrementing the credit value of the queue by an amount based on the guaranteed rate after the given timeslot.

47. The method of claim 45, wherein each queue in the group of queues has a class of service associated therewith, and wherein the class of service of each queue in the group is the same.

48. The method of claim 47, wherein calculating a guaranteed rate for each queue comprises: determining as the guaranteed rate for each queue an amount equal to the product of the queue metric for the queue and the guaranteed bandwidth amount for the ingress divided by the sum of the queue metrics for the queues in the group.

49. The method of claim 48, wherein the queue metric information comprises queue length information.

50. A method for determining a guaranteed rate for use in apportioning bandwidth across a shared link, comprising: maintaining information regarding a queue metric for each queue in a group of queues; calculating a guaranteed rate for each queue in the group of queues based on the queue metric information and a guaranteed bandwidth amount for the group of queues; and sending the guaranteed rate to an ingress associated with each queue, wherein the guaranteed rates are used to apportion bandwidth.

51. The method of claim 50, wherein the guaranteed bandwidth amount is a guaranteed bandwidth amount for an egress, wherein each of the queues in the group of queues have packets destined for the egress, and wherein calculating a guaranteed rate comprises calculating a guaranteed rate that apportions the guaranteed bandwidth amount for the egress among the group of queues that reside in at least one ingress.

52. The method of claim 51, wherein calculating a guaranteed rate comprises: determining as the guaranteed rate for each queue an amount equal to the product of the queue metric for the queue and the guaranteed bandwidth amount for the egress divided by the sum of the queue metrics for the queues in the group.

53. The method of claim 50, wherein the guaranteed bandwidth amount is a guaranteed bandwidth amount for an ingress, and wherein calculating a guaranteed rate comprises calculating a guaranteed rate that apportions the guaranteed bandwidth amount for the ingress among the group of queues that have packets destined for at least one egress.

54. The method of claim 53, wherein the act of calculating a guaranteed rate comprises: determining as the guaranteed rate for each queue an amount equal to the product of the queue metric for the queue and the guaranteed bandwidth amount for the ingress divided by the sum of the queue metrics for the queues in the group.

55. An apparatus for determining a guaranteed rate for use in apportioning bandwidth across a shared link, comprising: a memory storing a program; a processor in communication with the memory; in which the processor is directed by the program to: maintain information regarding a queue metric for each queue in a group of queues; calculate a guaranteed rate for each queue in the group of queues based on the queue metric information and a guaranteed bandwidth amount for the group of queues; and send the guaranteed rate to an ingress associated with each queue, wherein the guaranteed rates are used to apportion bandwidth.

56. A computer-readable medium for determining a guaranteed rate for use in apportioning bandwidth across a shared link, the computer-readable medium storing instructions that direct a microprocessor to: maintain information regarding a queue metric for each queue in a group of queues; calculate a guaranteed rate for each queue in the group of queues based on the queue metric information and a guaranteed bandwidth amount for the group of queues; and send the guaranteed rate to an ingress associated with each queue, wherein the guaranteed rates are used to apportion bandwidth.

57. A method for apportioning bandwidth across a shared link, comprising: determining information regarding a queue metric for each queue in a group of queues; transmitting the queue metric information to a bandwidth allocator module; receiving a guaranteed rate for each queue in the group from the bandwidth allocator module; adjusting a credit value associated with each queue by: decrementing the credit value of the queue by an appropriate amount if the queue is serviced in a given timeslot; and incrementing the credit value of the queue by an amount based on the guaranteed rate of the queue after the given timeslot; and determining a priority for each queue in the group using the credit values, the priorities acting to allocate bandwidth.

58. An apparatus for apportioning bandwidth across a shared link, comprising: a memory storing a program; a processor in communication with the memory; in which the processor is directed by the program to: determine information regarding a queue metric for each queue in a group of queues; transmit the queue metric information to a bandwidth allocator module; receive a guaranteed rate for each queue in the group from the bandwidth allocator module; adjust a credit value associated with each queue by: decrementing the credit value of the queue by an appropriate amount if the queue is serviced in a given timeslot; and incrementing the credit value of the queue by an amount based on the guaranteed rate of the queue after the given timeslot; and determine a priority for each queue in the group using the credit values, the priorities acting to allocate bandwidth.

59. A method for apportioning bandwidth across a shared link, comprising: calculating a guaranteed rate for each queue in at least one ingress based on queue metric information and a guaranteed bandwidth amount; calculating a priority for each queue to connect with the shared link in a given timeslot, the priority for each queue being instantaneous for the given timeslot and being based on the guaranteed rate for each queue; and determining at least one queue to service during the given timeslot based on the priority of each queue.

60. A method for apportioning bandwidth across a shared link, comprising: determining queue metric information for each queue within a plurality of ingresses; calculating a guaranteed rate for each queue based on the queue metric information and a guaranteed bandwidth amount for a group of queues; adjusting a credit value associated with each queue by: adjusting the credit value of the queue by an appropriate amount if the queue is serviced in a given timeslot; and adjusting the credit value of the queue by an amount based on the guaranteed rate after the given timeslot; using the credit values to calculate a priority for each queue, wherein the priority is instantaneous for a given timeslot for data transfer; for each group of queues within the plurality of ingresses having first-out packets destined for a particular egress, selecting a queue having a highest priority; and servicing the selected queues having the highest priorities across the shared link in the given timeslot, wherein each ingress communicates with a single egress during the given timeslot.

61. A system for apportioning bandwidth across a shared link, comprising: a bandwidth allocator module to calculate a guaranteed rate for each queue in at least one ingress based on queue metric information and a guaranteed bandwidth amount; a metering module in each ingress to calculate a priority for each queue in the ingress to connect with the shared link in a given timeslot, the priority for each queue being instantaneous for the given timeslot and being based on the guaranteed rate for each queue; and an arbitration module to determine at least one queue to service during the given timeslot based on the priority of each queue.

62. A system for apportioning bandwidth across a shared link, comprising: an ingress chip containing a plurality of queues and a metering module to calculate a priority for each queue in the ingress chip to connect with the shared link in a given timeslot, the priority for each queue being instantaneous for the given timeslot and being based on a guaranteed rate for each queue; and an arbiter chip containing: (a) a bandwidth allocator module to calculate the guaranteed rate for each queue within one or more ingress chips based on queue metric information and a guaranteed bandwidth amount; and (b) an arbitration module to determine at least one queue to service during the given timeslot based on the priority of each queue.

63. A method for apportioning bandwidth across a shared link, comprising: maintaining information regarding a queue metric for each queue in a group of queues; calculating a guaranteed rate for each queue in the group of queues based on the queue metric information and a guaranteed bandwidth amount for the group of queues; sending the guaranteed rate for each queue to an ingress associated with each queue, wherein each ingress is capable of calculating a priority for each queue in the ingress using the guaranteed rate for the queue; receiving from each ingress information regarding at least one queue having a first priority selected from each group of queues within each ingress having packets destined for a particular egress; selecting a queue having a second priority for each subset of queues having first priorities and having packets destined for the particular egress; and selecting the queue having the second priority for service across the shared link in the given timeslot.

64. A method for apportioning bandwidth across a shared link, comprising: determining information regarding a queue metric for each queue within an ingress; transmitting the queue metric information to a bandwidth allocator module; receiving a guaranteed rate for each queue from the bandwidth allocator module, the guaranteed rate calculated at least in part using the queue metric information; adjusting a credit value associated with each queue by: decrementing the credit value of the queue by an appropriate amount if the queue is serviced in a given timeslot; and incrementing the credit value of the queue by an amount based on the guaranteed rate of the queue after the given timeslot; determining a priority for each queue within the ingress, wherein the priority is instantaneous for the given timeslot; for each group of queues within the ingress having packets destined for a particular egress, selecting at least one queue having a first priority; sending to an arbitration module information regarding each queue within the ingress having a first priority; and receiving from the arbitration module information regarding a queue having a second priority, wherein the queue having the second priority determines with which egress the ingress will communicate during the given timeslot.

65. A method for servicing queues across a shared link, comprising: ascertaining the size of a first-out packet for each queue within an ingress; and if the size of the first-out packet in any queue is too large for transmission across the shared link in a single given timeslot for data transfer, maintaining a connection to the shared link when the queue having the first-out packet is selected for data transfer such that the entire first-out packet is transferred across the shared link in two or more timeslots for data transfer.

66. The method of claim 65, wherein maintaining a connection to the shared link comprises: when the queue having the first-out packet is selected for data transfer, assigning its queue a maximum priority for at least one timeslot immediately following the given timeslot, wherein the queue having the maximum priority is serviced during the at least one timeslot immediately following the given timeslot.

67. A method for determining a priority for each queue of a plurality of queues in a system, wherein the priorities determine allocation of bandwidth across a shared link and the queue having the highest priority is served during a given timeslot, comprising: if the queue contains a partial packet, setting the priority to a maximum priority; if the queue is empty, setting the priority to a minimum priority; and if the queue has a credit value that is greater than zero, determining the priority to be a rounded number between the maximum priority and the minimum priority equal to the credit value divided by a scaling factor.

68. A system comprising: a switch link; at least one ingress chip and at least one egress chip, wherein the switch link is disposed between the at least one ingress chip and the at least one egress chip, the ingress chip having a metering module to: (a) determine a priority for each queue within the ingress chip, wherein the priority is instantaneous for a given timeslot for data transfer; and (b) for each group of queues within the ingress chip having packets destined for a particular egress chip, select at least one queue having a first priority; and an arbiter chip having an arbitration module to select at least one queue having a second priority from each subset of selected queues having first priorities and having packets destined for the particular egress, the selected queue having the second priority being the queue for service across the switch link in the given timeslot.

* * * * *

UNITED STATES PATENT AND TRADEMARK OFFICE
CERTIFICATE OF CORRECTION

PATENT NO.      : 7,415,477 B2
APPLICATION NO. : 10/482864
DATED           : August 19, 2008
INVENTOR(S)     : Devadas et al.

It is certified that error appears in the above-identified patent and that said Letters Patent is hereby corrected as shown below:

Column 15, Line 33, please delete " $g^i_{j,q}(t) = \dfrac{(L^i_{j,q}(t) \times F_{j,q})}{\Sigma_{k:inputs} L^k_{j,q}(t)}$ "

and insert -- $g^i_{j,q}(t) = \dfrac{(L^i_{j,q}(t) \times F_{j,q})}{\Sigma_{k:inputs} L^k_{j,q}(t)}$ for all i --

Signed and Sealed this

Eighteenth Day of November, 2008

JON W. DUDAS
*Director of the United States Patent and Trademark Office*